(12) United States Patent
Ogawa et al.

(10) Patent No.: US 7,864,473 B2
(45) Date of Patent: Jan. 4, 2011

(54) ELECTRIC FIELD APPLYING MAGNETIC RECORDING METHOD AND MAGNETIC RECORDING SYSTEM

(75) Inventors: Susumu Ogawa, Cambridge (GB); Hiromasa Takahashi, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 213 days.

(21) Appl. No.: 11/829,125

(22) Filed: Jul. 27, 2007

(65) Prior Publication Data

US 2008/0068937 A1   Mar. 20, 2008

(30) Foreign Application Priority Data

Sep. 20, 2006   (JP) .............................. 2006-253719

(51) Int. Cl.
*G11B 5/147* (2006.01)
(52) U.S. Cl. ........................................ 360/55; 369/126
(58) Field of Classification Search ............... 369/13.17
See application file for complete search history.

(56) References Cited

U.S. PATENT DOCUMENTS

| 5,142,513 | A * | 8/1992 | Takehara et al. | ......... 369/13.45 |
| 5,486,967 | A * | 1/1996 | Tanaka et al. | ............... 360/318 |
| 5,723,198 | A * | 3/1998 | Hosoe et al. | ................ 428/141 |
| 6,480,412 | B1 | 11/2002 | Bessho et al. | |
| 6,881,496 | B2 * | 4/2005 | Okamoto | .................... 428/828 |
| 6,930,847 | B2 * | 8/2005 | Kai et al. | ...................... 360/59 |
| 7,042,669 | B2 | 5/2006 | Ogawa et al. | |

(Continued)

FOREIGN PATENT DOCUMENTS

JP    2001-196661    7/2001

(Continued)

OTHER PUBLICATIONS

J.C. Slonczewski; Current-driven excitation of magnetic multilayers; Journal of Magnetism and Magnetic Materials 159; 1996; L1-L7.

(Continued)

*Primary Examiner*—Daniell L Negrón
*Assistant Examiner*—Kezhen Shen
(74) *Attorney, Agent, or Firm*—Antonelli, Terry, Stout & Kraus, LLP.

(57) ABSTRACT

A method for writing information on a highly coercive recording medium stably with an electric field applied through a metal probe and with a magnetic field applied from external and an information recording system that employs the method. The recording medium includes a substrate, a first ferromagnetic layer formed on the substrate, a nonmagnetic layer formed on the first ferromagnetic layer, and a second ferromagnetic layer formed on the nonmagnetic layer. The coercivity $Hc_2$ of the second ferromagnetic layer is larger than that $Hc_1$ of the first ferromagnetic layer. A magnetic field H is applied to the magnetic recording medium from a magnetic pole to change the magnetizing direction of the first ferromagnetic layer to a direction of the applied magnetic field, then a positive or negative voltage V is applied between the metal probe and the magnetic recording medium to change the quantum well level energy between the first and second ferromagnetic layers, thereby inducing an exchange magnetic field $H_E$. As a result, the magnetizing direction of the second ferromagnetic layer is changed with both the exchange magnetic field $H_E$ and the magnetic field H.

16 Claims, 11 Drawing Sheets

U.S. PATENT DOCUMENTS

| | | | |
|---|---|---|---|
| 7,068,452 B2* | 6/2006 | Ogawa et al. | 360/55 |
| 2003/0053238 A1* | 3/2003 | Kai et al. | 360/59 |
| 2003/0072095 A1* | 4/2003 | Saito | 360/17 |
| 2003/0170499 A1* | 9/2003 | Okamoto | 428/694 MM |
| 2004/0136107 A1* | 7/2004 | Sugimoto | 360/59 |
| 2004/0228024 A1 | 11/2004 | Ogawa et al. | |
| 2005/0014028 A1* | 1/2005 | Umeda et al. | 428/694 T |
| 2005/0048325 A1* | 3/2005 | Ajan | 428/694 TM |
| 2005/0053803 A1* | 3/2005 | Umeda et al. | 428/694 T |
| 2006/0044661 A1* | 3/2006 | Ogawa et al. | 360/59 |
| 2006/0181799 A1* | 8/2006 | Inomata | 360/59 |
| 2007/0076533 A1 | 4/2007 | Ogawa et al. | |

FOREIGN PATENT DOCUMENTS

| | | |
|---|---|---|
| JP | 2004-342183 | 12/2004 |
| JP | 2006-065927 | 3/2006 |

OTHER PUBLICATIONS

J.E. Mattson; Photoinduced Antiferromagnetic Interlayer Coupling in Fe/(Fe-Si) Superlattices; Physical Review Letters Jul. 5, 1993; pp. 185-188; vol. 71, No. 1.

Chun-Yeol You, et al.; Voltage controlled spintronic devices for logic applications; Journal of Applied Physics May 1, 2000; pp. 5215-5217; vol. 87, No. 9.

* cited by examiner

ELECTRIC FIELD APPLYING MAGNETIC RECORDING METHOD AND MAGNETIC RECORDING SYSTEM

CLAIM OF PRIORITY

The present application claims priority from Japanese application JP 2006-253719 filed on Sep. 20, 2006, the content of which is hereby incorporated by reference into this application.

FIELD OF THE INVENTION

The present invention relates to a method for writing and reading magnetization information and a magnetic recording system that employs the method.

BACKGROUND OF THE INVENTION

A conventional hard disk drive (HDD) employs a method that uses a magnetic head for writing magnetization information with a magnetic field generated from a coil.

Now, hard disk drives are demanded further to cope with higher density recording and their magnetic head tip parts are required to be fabricated more finely to meet the refinement of the recording domain being progressed in accordance with the requirements of such higher density recording. However, it is estimated that the magnetic field intensity to be generated from a magnetic head is lowered along with the refinement of the magnetic head tip part due to an influence of antimagnetic components generated from the magnetic head tip part itself.

On the other hand, to keep the magnetization of the recording domain stably, a level of about $KuV/k_BT>50$ is required. Here, Ku denotes a magnetic anisotropy constant, V denotes a magnetization cubic volume, $k_B$ denotes a Boltzmann's constant, and T denotes a temperature. If V becomes minuter along with higher density recording, the coercivity of the material having a larger Ku value is required to overcome the thermal instability in the written magnetizing direction. A magnetic field for writing is required to be increased more than the conventional one to write a magnetizing direction in this material having high coercivity.

Thus the conventional method that uses a magnetic head for writing magnetization information in high density recording comes to its limit and now, users are in need of a new writing method that can take the place of the conventional method.

For example, if the recording density is over 1Tb/inch2, it is considered that the recording medium comes to require coercivity over 10 KOe.

To cope with such a demand, a thermally assisted writing method is proposed. This method heats the object recording medium locally with use of a laser beam to lower the coercivity only in the object region of writing, thereby enabling the writing with a magnetic field to be generated from the magnetic head. This technique can reduce the writing magnetic field, so that it is considered to be a promising technique for writing magnetization information, employable in high density recording. However, because the object region is heated with a focused laser beam, the refinement in that region becomes difficult and this has been a problem.

A method that uses no magnetic field is proposed by, for example, J. Slonczewski, J. Mag. Mag. Mater, 159, L1 (1966). The method employs a spin injection magnetization inversion technique. According to this method, spin polarized electrons are injected into an object magnetic medium to invert the magnetizing direction, thereby enabling writing in the medium. In the case of this method, however, the write current threshold value is as high as about $10^6$ A/cm$^2$. In addition, the medium requires wiring for taking in a current while it is in contact. Otherwise, the medium cannot take in a current enough. This is why the method is not suitable so much for writing on a non-wiring ultra-high density recording medium such as hard disk drives.

There is another proposed writing method that uses an electric field to control magnetization. For example, Mattsonet et al, Phys. Rev. Lett. 71, 185 (1993) discloses such a technique for controlling an exchange interaction to occur between ferromagnetic media by controlling a carrier density in an object semiconductor layer with an electric field in an in-stack structure composed of a ferromagnetic metal layer, a semiconductor layer, and a ferromagnetic metal layer.

Chun-Yoel Youi et al., J. Appl. Phys., 87, 5215 (2000) also discloses a technique for controlling the exchange interaction to occur between ferromagnetic materials by providing an insulation layer in a three-layer structure composed of a ferromagnetic metal layer, a nonmagnetic metal layer, and a ferromagnetic metal layer and applying a voltage between ferromagnetic metal layers.

Furthermore, JP-A No. 2001-196661 discloses a technique for providing a semiconductor layer outside a three-layer structure composed of a ferromagnetic metal layer, a nonmagnetic metal layer, and a ferromagnetic metal layer and controlling the exchange interaction to occur between ferromagnetic materials by controlling both the width and the height of a Schottky barrier to be generated at the phase boundary between a ferromagnetic metal layer and a semiconductor with an electric field.

JP-A No. 2004-342183 also discloses a method and an apparatus for applying a local electric field to a recording medium having a three-layer structure composed of a ferromagnetic metal layer, a nonmagnetic metal layer, and a ferromagnetic metal layer with use of a metal probe, thereby controlling magnetization.

Furthermore, the JP-A No. 2006-65927 discloses a method and an apparatus for applying a local electric field and an assist magnetic field to an object recording medium having a three-layer structure composed of a ferromagnetic metal layer, a nonmagnetic metal layer, and a ferromagnetic metal layer with use of a metal probe, thereby controlling magnetization. In JP-A No. 2006-65927, the polarity of the voltage applied to the metallic probe is changed from positive $V_0$ to negative $-V$ or from negative $-V$ to positive $V_0$, then an assist magnetic field is applied to the object medium in a magnetizing direction for writing, thereby inverting the magnetizing direction. In other words, both the voltage and the magnetic field are inverted.

Those magnetization control techniques that use an electric field respectively can improve recording density and reduce power consumption. Thus they can be considered to be promising techniques.

SUMMARY OF THE INVENTION

The method disclosed in the JP-A No. 2006-65927, however, inverts not only the magnetic field, but also the voltage, so that the method makes controlling unstable due to the variation of the work function on the inverted surface and changes of the probe floating height.

In order to provide a semiconductor layer or insulation layer in the three-layer structure composed of a ferromagnetic layer, a nonmagnetic layer, and a ferromagnetic layer and control the magnetization with a voltage, the layer is required to be thinned to about 2 nm or under. Even when a semiconductor layer is provided outside the three-layer structure, the phase boundary between the magnetic layer and the semiconductor layer is required to be formed steeply up to an atomic layer level. Forming such layers is very difficult.

In addition, as a recording medium as described above, such a wiring type memory as MRAM, which is lower in density than hard disk drives, is expected and it is difficult to apply a voltage in a non-wiring ultra-high density recording medium such as hard disk drives. There is another method that avoids all those difficulties. The method applies an electric field in a three-layer structure composed of a ferromagnetic metal layer, a nonmagnetic metal layer, and a ferromagnetic metal layer with use of a metal probe. Nevertheless, variation of the distance between the medium surface and the metal probe comes to unavoidably cause variation in both positive and negative sizes, as well as in the polarity of the electric field applied necessarily to invert the object magnetizing direction.

Under such circumstances, it is an object of the present invention to solve the above conventional problems and provide a method for writing information to a recording medium with an electric field applied through a metal probe and with a magnetic field applied from external. It is another object of the present invention to provide an information recording system that employs the method. The recording medium is required of a high density over, for example, 1Tb/inch2 and coercivity over, for example, 10 KOe.

In order to achieve the above objects, the present invention forms at least a three-layer structure composed of a highly coercive ferromagnetic layer, a nonmagnetic layer, and a lowly coercive ferromagnetic layer. A protection film may be provided outside the three-layer structure.

It is assumed here that the highly coercive ferromagnetic layer and the lowly coercive ferromagnetic layer have coercivity values of $Hc_2$ and $Hc_1$, respectively. It is also assumed here that those ferromagnetic layers are in a relationship of $Hc_1<H<Hc_2$ with the externally applying magnetic field H. The externally applying magnetic field H cannot invert the magnetizing direction of the highly coercive ferromagnetic layer by itself while it can invert the magnetizing direction of the lowly coercive ferromagnetic layer by itself.

To solve this problem, the metal probe is brought close to the three-layer structure or a multilayer film including a protection film. If the metal probe is brought close to this multilayer film up to the order of 1 to 5 nm and a positive or negative electric field is applied to the multilayer film, the image potential of the surface of the multilayer film is modulated. This image potential keeps electrons in the multilayer film and if this potential is modulated, the condition for keeping the electrons in the film changes. As a result, the quantum level energy in the multilayer film changes, thereby the magnetic exchange interaction that works between the ferromagnetic layers also changes.

It is assumed here that $H_E$ is defined as a size of the exchange magnetic field induced between two ferromagnetic layers caused by an electric field applied through this metal probe. However, it is assumed here that the magnetic exchange interaction that works between those ferromagnetic layers is almost 0 when no electric field is applied.

Thus magnetization information can be written in the highly coercive ferromagnetic layer by applying a magnetic field H from external and an electric field $H_E$ applied through a metal probe to the object recording medium having a three-layer structure that satisfies $Hc_1<H-H_E$ and $Hc_2<H+H_E$.

When rewriting the magnetization information, that is, to invert the magnetizing direction of the highly coercive ferromagnetic layer, the external magnetic field applying direction is inverted and the same pole electric field is applied again to the object layer through the metal probe.

According to the present invention, therefore, it is just required to apply a positive or negative voltage and it is no need to change the polarity of the electric field to be applied (it is no need to change the polarity of the voltage $-V_0$ to be applied). Thus magnetization information can be rewritten stably regardless of the electric field variation that depends on the state of the surface of the recording medium and the distance between the metal probe and the surface of the medium, since the variation range of the induced exchange magnetic field $H_E$ is small.

DETAILED DESCRIPTION OF THE PREFERRED EMBODIMENTS

First Embodiment

Figure 1:
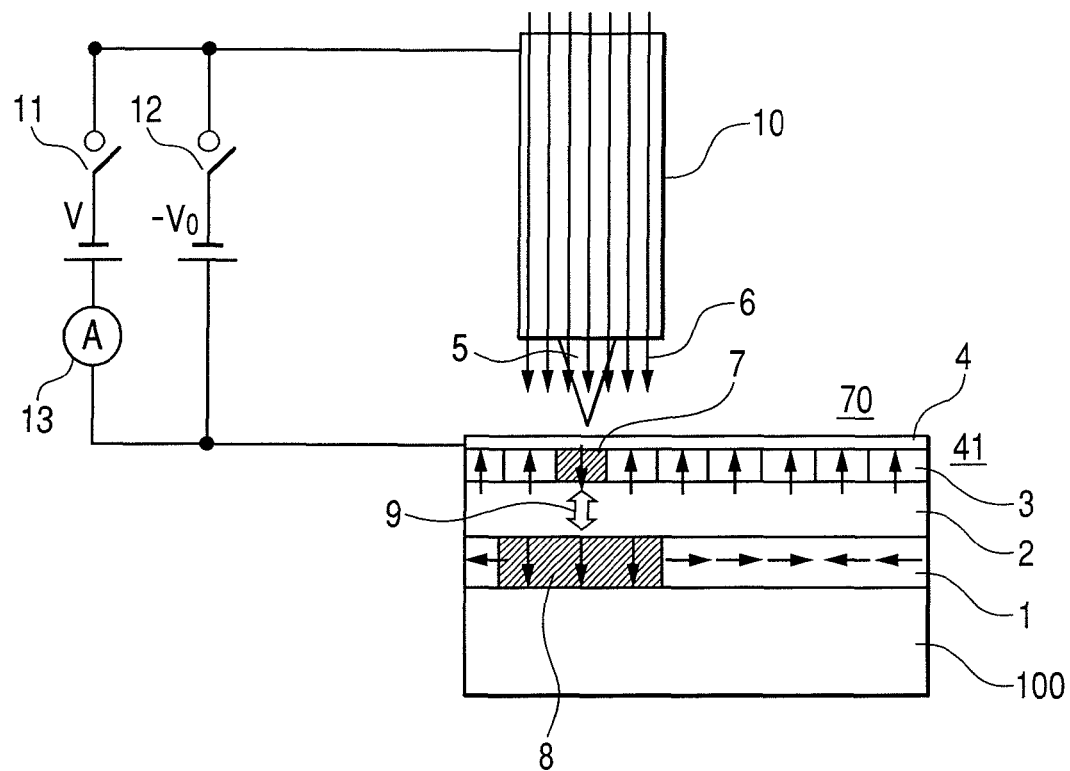
FIG. 1 is configurations of a magnetic recording medium 70, as well as a metal probe 5 and a magnetic pole 10 provided so as to face the medium 70 respectively in a first embodiment.
Figure 2:
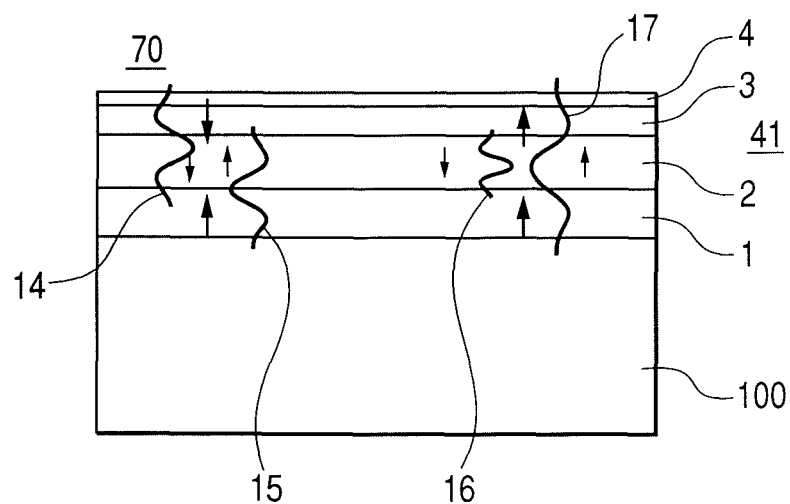
FIG. 2 is states of quantum wells in a multilayer film 41 in the first embodiment.

Hereunder, a first embodiment of the present invention will be described with reference to FIGS. 1 through 3. FIG. 1 shows a first embodiment of the present invention, which is a concept diagram for showing configurations of a magnetic recording medium 70, as well as a metal probe 5 and a magnetic pole 10 provided so as to face the medium 70. The magnetic recording medium 70 consists of a substrate 100 and a multilayer film 41 formed on the substrate by stacking a first ferromagnetic layer (low coercivity) 1, a nonmagnetic layer 2, a second ferromagnetic layer (high coercivity) 3, and a protection layer 4 sequentially.

It is assumed here that the highly coercive ferromagnetic layer 3 and the lowly coercive ferromagnetic layer 1 have coercivity values of $Hc_2$ and $Hc_1$, respectively. It is also assumed here that those ferromagnetic layers have a relationship of $Hc_1<H<Hc_2$ with the externally applying magnetic field H.

A metal probe 5 is disposed so as to face the surface of the protection film 4 of the multilayer film 41 so closely up to the order of 1 nm. The metal probe 5 is held similarly to a slider mechanism provided in a hard disk drive.

Here, it is also possible to use a tunnel current as a feedback signal separately to control the distance between the protection film 4 and the metal probe 5. An optical lever system used in an atomic force microscope may be used to generate the feedback signal. A distance controlling probe may be provided separately from an electric field controlling metal probe 5 to be described below.

The highly coercive ferromagnetic layer 3 of the multilayer film 41 may be, for example, an alloy film made of FePt, CoPt, CoPd, CoCrPt, FePd, TbFeCo, etc. and composed of columnar crystal of a diameter of 3 to 20 nm.

The lowly coercive ferromagnetic layer 1 may be, for example, an alloy film made of ferromagnetic single metal such as Fe, Co, Ni, etc., an alloy film made of CoFe, NiFe, CoNi, etc., or a continuous film made of FePt, CoPt, CoPd, CoCrPt, FePd, etc.

Even when the same material is used for both highly coercive and lowly coercive ferromagnetic layers, the coercivity comes to differ between those layers if their structures are different, for example, if the highly coercive ferromagnetic layer is made of columnar crystal having a diameter of about 3 to 20 nm while the lowly coercive ferromagnetic layer is formed as a continuous film.

The lowly coercive ferromagnetic layer 1 and the highly coercive ferromagnetic layer 3 may be a soft magnetic layer and a hard magnetic layer, or both layers may be so-called soft magnetic layers, or both layers may be hard magnetic layers.

The nonmagnetic layer 2 may be made of, for example, such metal as Au, Ag, Cu, Pt, Pd, Ru, or the like. The protection film 4 may be made of, for example, any of nonmagnetic metal such as Au, and conductive C. In this embodiment, FePt, which is a perpendicular magnetic film, is used for the highly coercive ferromagnetic layer 3, Au is used for the nonmagnetic layer 2, Fe is used for the lowly coercive ferromagnetic layer 1, and Au is used for the protection layer 4.

At first, a magnetic field H is applied to the medium in the writing direction from the magnetic pole 10 provided close to the metal probe 5. The coercivity $Hc_2$ of the highly coercive ferromagnetic layer 3, the coercivity $Hc_1$ of the lowly coercive ferromagnetic layer 1, and the magnetic field H generated from the magnetic pole 10 are in a relationship of $Hc_1<H<Hc_2$. Consequently, the magnetic field H cannot invert the magnetizing direction of the ferromagnetic layer 3 by itself while it can align the magnetizing direction of the ferromagnetic layer 1 to a direction of the applied magnetic field.

Because Fe is used for the ferromagnetic layer 1, the magnetizing direction of the ferromagnetic layer 1 faces the longitudinal direction of the thin film that is orthogonal to the applied magnetic field.

The magnetizing direction of the highly coercive ferromagnetic layer and that of the lowly coercive ferromagnetic layer while no magnetic field is applied may be orthogonal to each other. While they are orthogonal to each other such way, magnetized perpendicular components are read only from the highly coercive ferromagnetic layer, thereby noise from the lowly coercive ferromagnetic layer can be reduced.

The magnetizing direction of the highly coercive ferromagnetic layer, as well as the magnetizing direction of the lowly coercive ferromagnetic layer while no magnetic field is applied may be in parallel or in antiparallel to each other. In such a case, their magnetization structures come to differ and noise, etc. to be generated upon reading come also to differ.

After that, the perpendicularly applied magnetic field H shown in FIG. 1 causes the ferromagnetic layer 1 is magnetized in the direction of the applied magnetic field in a region 8.

The electrons around the Fermi level in the multilayer film 41 are kept therein and work to form quantum wellstates 14 to 17. If the ferromagnetic layers 1 and 3 are magnetized in parallel to each other, most of the electrons having antiparallel spin to the magnetizing direction of those layers 1 and 3 are kept in the nonmagnetic layer 2 just like the state 16 while all the electrons having parallel spin to the magnetizing direction of those layers 1 and 3 are localized completely in the multilayer film 41 just like the state 17.

On the other hand, if the ferromagnetic layers 1 and 3 are magnetized in antiparallel to each other, the electrons are kept in different films depending on the spin direction respectively just like the state 14 or 17.

The state of the electrons to form those quantum wells depends on not only the magnetizing directions of the ferromagnetic layers 1 and 3, but also sensitively on the state of the surface of the protection film 4. When the metal probe 5 is brought close to the surface of the protection film 4, the image potentials of the protection film 4 and the metal probe 5 are put one upon the other, thereby the effective potential for keeping the quantum well electrons changes.

On the other hand, as shown in FIG. 1, a voltage $-V_0$ can be applied between the multilayer film 41 and the metal probe 5 while the distance between the surface of the protection film 4 and the metal probe 5 is kept at a predetermined value. In other words, if the voltage $-V_0$ is applied to the object medium by turning on a switch 12, the electrons keeping potential on the surface of the protection film 4 changes.

As a result, the phase boundary condition for keeping the quantum well electrons changes, the energy level of those quantum well electrons also changes. Upon the change of the energy of this quantum well level (magnetic interaction), the magnetic exchange interaction between the highly coercive ferromagnetic layer 3 and the lowly coercive ferromagnetic layer 1 also changes, thereby an exchange magnetic field 9 ($H_E$) is induced as to be shown later in FIG. 3. However, the thickness of the non-magnetic layer 2 is set here so that almost 0 is assumed for the magnetic exchange interaction between those ferromagnetic layers when no electric field is applied to the object layer.

Next, a description will be made concretely for the steps for writing magnetization information in the highly coercive ferromagnetic layer 3. At first, a magnetic field H is applied to the multilayer film 41 from the magnetic pole 10. At this time, the magnetizing direction of the lowly coercive ferromagnetic layer 1 is aligned to the direction of the applied magnetic field due to the magnetic field H applied from external. This is because the coercivity $Hc_1$ of the ferromagnetic layer 1 is smaller than the applied magnetic field H. On the other hand, the applied magnetic field H cannot align the magnetizing direction of the ferromagnetic layer 3 to the direction of the applied magnetic field only by itself. This is because the coercivity $Hc_2$ of the ferromagnetic layer 3 is larger than the applied magnetic field H.

After that, the switch 12 is turned on to apply a positive or negative polarity voltage to an object layer. Here, the voltage is assumed to be $-V_0$. At this time, an exchange magnetic field 0 ($H_E$) is induced so as to magnetize the ferromagnetic layers 1 and 3 in parallel to each other. As a result, a magnetic field $H+H_E$ that is larger than $Hc_2$ of the ferromagnetic layer 3 is applied to the ferromagnetic layer 3, so that the magnetizing direction of the ferromagnetic layer 3 is inverted.

In other words, when rewriting the magnetizing direction of the ferromagnetic layer 3, that is, when inverting the magnetizing direction, the applying direction of the external magnetic field H is inverted, then the same polarity voltage $-V_0$ is applied again to the layer 3.

Applying both the magnetic field H and the voltage $-V_0$ from external and from the metal probe respectively as described above makes it possible to write a magnetizing direction in the highly coercive ferromagnetic layer 3 that satisfies $Hc_2 < H+H_E$ while the magnetic field H from external cannot write the magnetizing direction in the layer 3 only by itself.

Because the ferromagnetic layer 3 can keep a coercive force in itself due to its magnetic anisotropy, the written magnetizing direction is kept as is even when the metal probe 5 and the external magnetic field 10 are excluded here.

Next, steps for reading magnetization information will be described concretely. At first, a switch 11 is turned on to apply a voltage V ($|V|<<|V_0|$) to the metal probe 5, then a magnetic field H is applied to the layer 41 from external, thereby magnetization information can be read from the multilayer film 41 with use of a tunnel current 13 flowing between the metal probe 5 and the multilayer film 41.

This is because the electrons energy level of the quantum wells formed in the multilayer film 41 changes according to whether the magnetizing directions in the ferromagnetic layers 1 and 3 are in parallel or in anti-parallel. Upon the change of the energy level, the tunnel current to be measured at a constant voltage V changes depending on the magnetizing direction.

Application of a magnetic field here is to align the magnetizing directions of the lowly coercive ferromagnetic layer 1 perpendicularly to the film surface and in one direction. The coercivity of the magnetic field may be smaller than the magnetic field H applied for writing.

Figure 3:
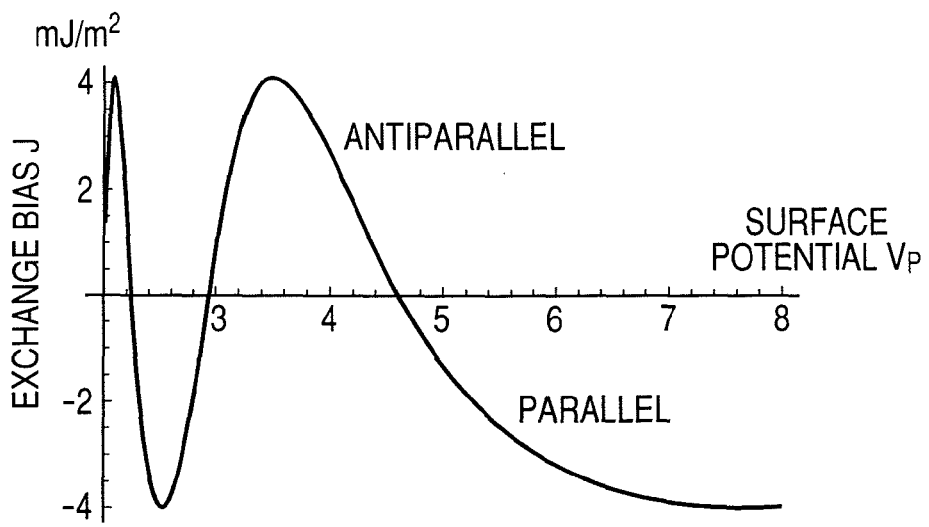
FIG. 3 is a graph for showing an example of calculating a magnetic exchange interaction energy as a function of a surface positional barrier height in the first embodiment.

FIG. 3 shows a graph for describing how to calculate a size of the magnetic exchange interaction energy J that works between the ferromagnetic layers 1 and 3 when the potential barrier height $V_P$ (horizontal axis) on the surface of the multilayer film 41 is changed with use of a metal probe. At this time, the highly coercive ferromagnetic layer 3 is formed as an FePt 13 ML layer (monolayer single atomic layer), the nonmagnetic layer 2 is formed as an Au 5 ML layer, the lowly coercive ferromagnetic layer 1 is formed as a 30 ML Fe layer, and the protection film 4 is formed as a 6 ML Au layer respectively.

Here, $V_P$ is equivalent to the work function (WF) of the surface modulated by the metal probe electric field. By assuming the probe voltage as V, the work function (WF) may be considered be approximate to $V_P$ to WF-V. When the prove voltage polarity is negative, the $V_P$ becomes large while the probe voltage polarity is positive, the $V_P$ becomes small. However, the $V_P$ value depends on the distance between the probe and the object layer surface, that is, an electric field.

If the J polarity is positive, the relative magnetizing directions of the ferromagnetic layers 1 and 3 are stably in anti-parallel to each other. If the J polarity is negative, the magnetizing directions of those ferromagnetic layers 1 and 3 are stably in parallel to each other. The polarity of the magnetic exchange interaction J that works between the ferromagnetic layers 1 and 3 can be made positive or negative freely by changing the potential on the surface of the protection film 4 with use of the metal probe 5. This means that the magnetizing directions of the ferromagnetic layers 1 and 3 can be inverted relatively with use of the metal probe 5.

Here, the exchange magnetic field $H_E$ induced by an electric field and the magnetic exchange interaction J are in a relationship of $H_E=J/(t.Ms)$ when "t" is assumed as the film thickness of FePt and "Ms" is assumed as saturated magnetization of FePt. For example, $H_E=6.7$ KOe is assumed at the time of J=−2 mJ/m2, t=3 nm, and Ms=1000 emu/cm3.

The magnetic exchange interaction energy J that works between the ferromagnetic layers 1 and 3 is almost 0 when the potential barrier height is about 4.6 eV at Au6ML/FePt 13ML/Au5ML/Fe as shown in FIG. 3.

Because the Au work function is up to 5.5 eV in maximum in this case, such alkaline metal as Cs, Ba, or the like, as well as alkaline earth metal are coated on the top surface of the object layer to lower the work function and set the potential barrier height at 4.6 eV, thereby the J value can be set at 0. While the J value is 0, no magnetic interaction is generated between the ferromagnetic layers 1 and 3.

At this time, if the metal probe 5 is brought close to the surface of the multilayer film 41 and a voltage $-V_0<0$ is applied between the metal probe 5 and the multilayer film 41, the potential barrier height increases significantly. It is therefore possible to set a negative value for the magnetic exchange interaction energy J that works between the ferromagnetic layers 1 and 3, that is, it is possible to invert the relative magnetizing directions of the ferromagnetic layers 1 and 3 so that those layers 1 and 3 are arranged stably in parallel to each other. This means that applying a voltage $-V_0$ to the metal probe makes it possible to apply an induced exchange magnetic field $H_E$ to the medium so that the relative magnetizing directions of the ferromagnetic layers 1 and 3 are arranged in parallel to each other.

When no electric field is applied with use of a metal probe, the potential barrier height $V_P$ is equivalent to the value of the work function of the surface of the multilayer film, but this $V_P$ value differs a little among the sucked matters and shapes of the surface of the multilayer film. Even while the voltage $-V_0$ applied through the metal probe is fixed, if the distance between the probe and the surface changes, the electric field between the probe and the surface also changes, thereby the $V_P$ changes.

According to the configuration in this first embodiment, if a negative voltage $-V_0$ is applied to the metal probe, the J value can be negative in a wider region of the $V_P$ ($V_P$>4.6 eV) as shown in FIG. 3. In other words, even when both the surface state and the distance between the probe and the surface change slightly, a predetermined J, that is, $H_E$ can be induced with an applied voltage $|V_0|$ that is enough large.

According to the configuration in this first embodiment, it is no need to change the polarity of the voltage $-V_0$ to be applied. Even when the electric field that depends on the state of the recording medium surface and the distance between the metal probe and the surface changes, the variation range of the induced exchange magnetic field $H_E$ is suppressed to a small value. Thus the magnetizing direction can be inverted stably.

As described above, because a magnetizing direction is inverted by inverting the magnetic field 6 applied from the magnetic pole 10, the application voltage may be fixed. Even in a region of 3<$V_P$<4.6 eV, a positive voltage $V_0$ can be applied to an object layer to invert its magnetizing direction. The present invention can therefore invert a magnetizing direction just by always applying a negative voltage $V_0$ or inverting the applying direction of the subject magnetic field.

As shown in FIG. 3, if a positive voltage is applied to the metal probe, the $V_P$ can be reduced and the relative magnetizing directions of the ferromagnetic layers 1 and 3 can be arranged stably in antiparallel to each other in the region of 3<$V_P$<4.6 eV. However, because the $V_P$ changes according to the surface state (WF) and the distance between the probe and the surface, it is difficult to control so as to keep 3<$V_P$<4.6 eV upon writing.

A magnetized recording region may include a plurality of regions obtained by dividing a space. In other words, the recording region may be a patterned medium, not a magnetic recording medium comprised of a so-called continuous film.

Magnetization information may be read with use of a method for reading the magnetizing direction of an object ferromagnetic layer with use of a magnetic repulsive force that works between a ferromagnetic metal probe and an object magnetized region. If the probe is magnetized, the magnetic force works depending on the magnetizing direction of the medium (just like a repulsive force that works between N and N). Consequently, the magnetizing direction of the medium can be imaged.

The metal probe or metal electrode may be embedded in the slider. If it is embedded in the slider, the metal probe floating can be controlled more easily.

Second Embodiment

Figure 4:
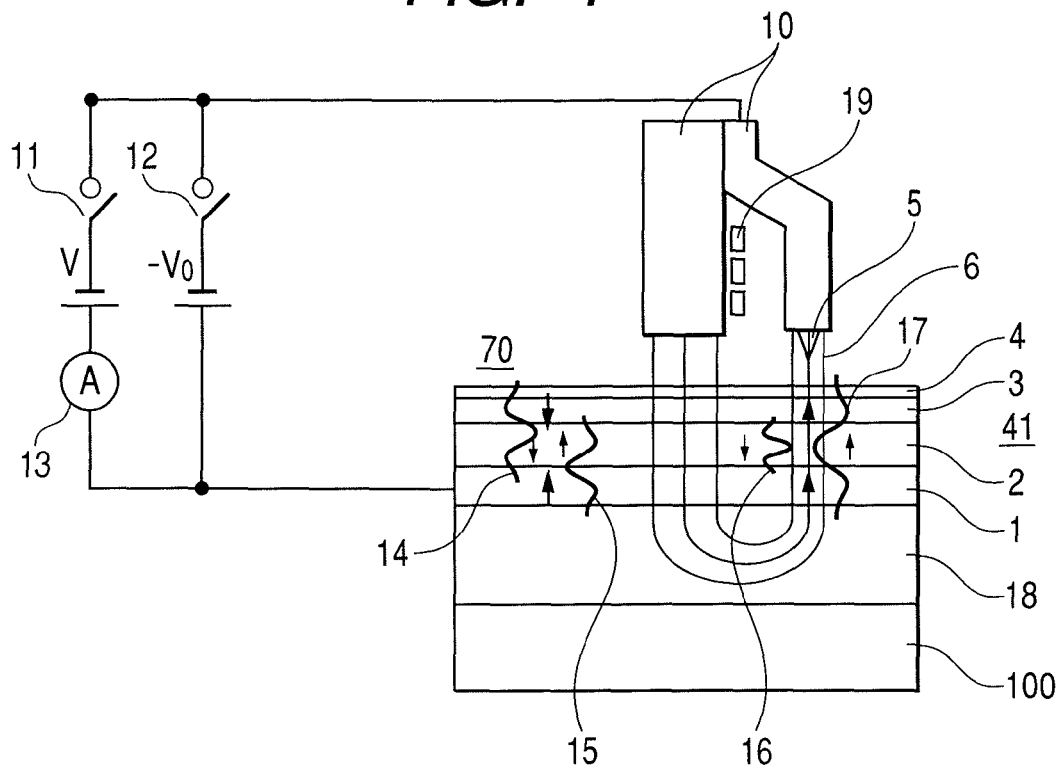
FIG. 4 is configurations of a magnetic recording medium 70, as well as a metal probe 5 and a magnetic pole 10 provided so as to face the medium 70 in a second embodiment.

As shown in FIG. 4, a soft magnetic layer 18, a lowly coercive ferromagnetic layer 1, a nonmagnetic layer 2, a highly coercive ferromagnetic layer 3, and a protection film 4 are stacked sequentially on a substrate 100 to be formed as a multilayer film 41. It is arranged here that a voltage $-V_0$ can be applied between the metal probe 5 and the multilayer film 41.

Here, the protection film 4 is made of, for example, such a nonmagnetic noble metal as Au. Although the magnetizing direction of the lowly coercive ferromagnetic layer 1 is in parallel to the film surface while no magnetic field is applied in the first embodiment, the magnetizing direction is perpendicular to the film surface in this second embodiment. For example, if the lowly coercive ferromagnetic layer 1 is formed as a continuous film made of FePt, CoPt, CoPd, CoCrPt, FePd, etc., the layer becomes a lowly coercive ferromagnetic layer that is magnetized perpendicularly to the film surface.

Just like the first embodiment, the electrons around the Fermi level in the multilayer film 41 are kept therein and work to form quantum well states 14 to 17. If a metal probe 5 is brought close to the surface of the protection film 4, the image potentials of the protection film 4 and the metal probe 5 are put one upon the other, thereby the effective potential that keeps the quantum well electrons changes.

At this time, a magnetic field 6 (H) is applied to the object layer in the magnetizing direction for writing from the magnetic pole 10 and the coil 19 respectively. Then, a voltage $-V_0$ is applied between the multilayer film 41 and the metal probe 5. As a result, an exchange magnetic field 9 ($H_E$) is induced so as to arrange the magnetizing directions of the ferromagnetic layers 1 and 3 in parallel to each other. Then, a magnetic field of H+$H_E$ is applied effectively to the ferromagnetic layer 3, thereby the magnetizing direction of the ferromagnetic layer 3 can be inverted; the magnetic field H cannot write any magnetization information in the ferromagnetic layer 3 only by itself.

Figure 5:
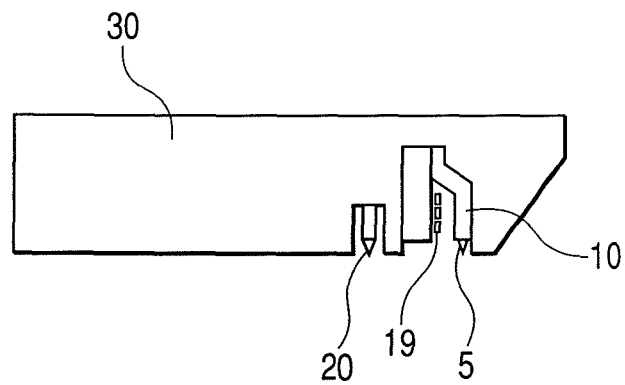
FIG. 5 is a configuration of a slider 30 in the second embodiment.

FIG. 5 shows an example in which a slider 30 is provided with a metal probe for reading with use of a tunnel current separately from a metal probe 5 for writing. In this case, the metal probe 5 is used only for writing and a tunnel current detecting potential V is applied to a metal probe 20 to read a magnetizing direction according to a change of the tunnel current as described in the first embodiment.

Third Embodiment

Figure 6:
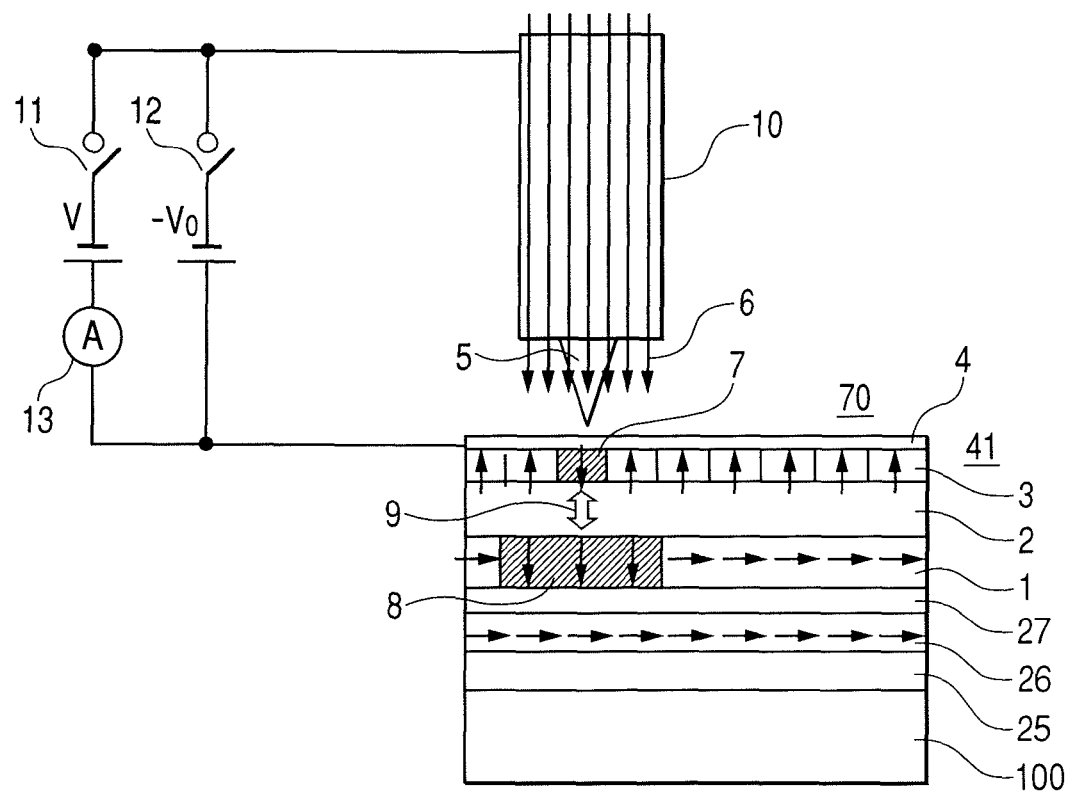
FIG. 6 is a concept diagram for showing configurations of a magnetic recording medium 70, as well as a metal probe 5 and a magnetic pole 10 provided so as to face the medium 70 respectively in a third embodiment.

As shown in FIG. 6, a magnetic recording medium 70 consists of an antimagnetic layer 25, a ferromagnetic layer 26, a nonmagnetic layer 27, a lowly coercive ferromagnetic layer 1, a nonmagnetic layer 2, a highly coercive ferromagnetic layer 3, and a protection film 4 that are stacked sequentially on a substrate 100 to be formed as a multilayer film 41. It is arranged here so that a voltage $-V_0$ can be applied between the metal probe 5 and the multilayer film 41.

Here, the protection film 4 is made of a nonmagnetic matter such as Au. The antimagnetic layer 25 works to fix the magnetizing direction of the ferromagnetic layer 26 in one direction. An exchange interaction works between the ferromagnetic layer 26 and the lowly coercive ferromagnetic layer 1, so that the lowly coercive ferromagnetic layer 1 is magnetized fixedly in one direction in parallel or in antiparallel to the magnetizing direction of the lowly coercive ferromagnetic layer 26. Then, the metal probe 5 is brought close to the surface of the protection film 4 and a magnetic field 6 is applied to the film 4 from the magnetic pole 10 and a voltage $-V_0$ is applied between the multilayer film 41 and the metal probe 5 through the metal probe 5 respectively.

Here, the applied magnetic field 6 is larger enough than the exchange interaction between the ferromagnetic layer 26 and the lowly coercive ferromagnetic layer 1 and this applied magnetic field 6 causes the lowly coercive ferromagnetic layer 1 to be magnetized perpendicularly to the film surface.

At this time, just like the first embodiment, the electrons around the Fermi level in the multilayer film 41 are kept therein and work to form quantum well states. If the metal probe 5 is brought close to the surface of the protection film 4 and the switch 12 is turned on to apply a voltage $-V_0$ to the probe 5, the image potentials of the protection film 4 and the metal probe 5 are put one upon the other to change the effective potential that keeps the quantum well electrons in the multilayer film 41.

If the electrons keeping potential on the surface of the protection film 4 changes, the phase boundary condition for keeping the quantum well electrons also changes, thereby the energy level of the quantum well electrons changes. This change of the energy level of the quantum well electrons changes the magnetic exchange interaction between the high coercive ferromagnetic layer 3 and the lowly coercive ferromagnetic layer 1, thereby an exchange magnetic field 9 ($H_E$) is induced.

The film thickness of the nonmagnetic layer 2 is set here so that the magnetic exchange interaction that works between ferromagnetic layers 1 and 3 becomes almost 0 while no electric field is applied.

Applying the magnetic field H from the magnetic pole 10 and the voltage $-V_0$ from the metal probe respectively makes it possible to write a magnetizing direction in the high coercive ferromagnetic layer 3 that satisfies $Hc_2 < H + H_E$; the external magnetic field H cannot write any magnetizing direction in the layer 3 only by itself.

Because the high coercive ferromagnetic layer 3 is given a coercive force due to its magnetic anisotropy, the written magnetizing direction is kept as is even when the metal probe 5 and the external magnetic field are excluded here.

When inverting the magnetizing direction of the high coercive ferromagnetic layer 3, the external magnetic field applying direction is inverted and the same polarity voltage $-V_0$ is applied again to the layer 3. The applied magnetic field H can align the magnetizing direction of the lowly coercive ferromagnetic layer 1 to the direction of the applied magnetic field, but it cannot align the magnetizing direction of the high coercive ferromagnetic layer 3 to the direction.

Here, upon applying the voltage $-V_0$ to the metal prove 5 by turning on the switch 12, an exchange magnetic field 9 is induced so that the magnetizing directions of the lowly coercive ferromagnetic layer 1 and the high coercive ferromagnetic layer 3 are arranged in parallel to each other, thereby an $H + H_E$ magnetic field is applied to the high coercive ferromagnetic layer 3. Consequently the magnetizing direction of the layer 3 is inverted.

Figure 7:
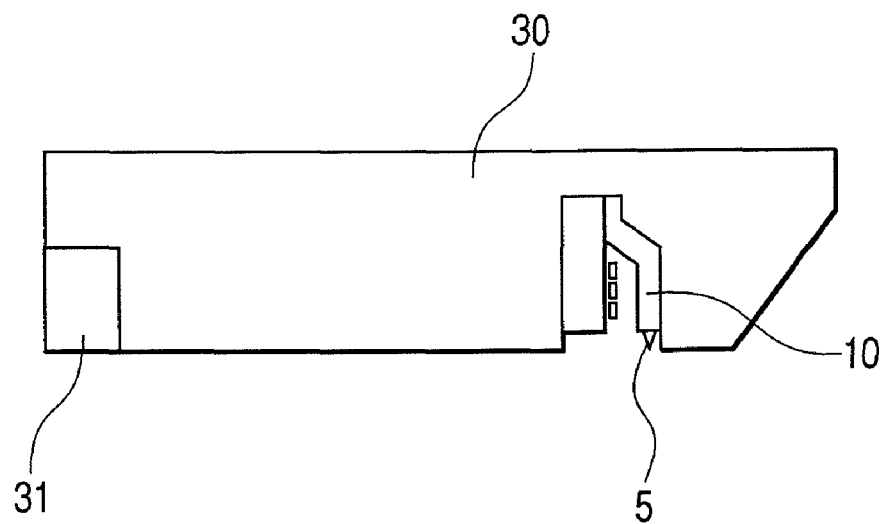
FIG. 7 is a diagram for showing a slider 30.

FIG. 7 shows an example in which the slider 30 is provided with a magnetization detecting element 31 that uses magnetic resistance changes to occur due to GMR, TMR, or the like instead of the detecting method that uses a tunnel current. Also in this case, the metal probe 5 is used only for writing and a magnetizing direction is read according to a resistance change of the magnetic resistance element 31.

Figure 8:
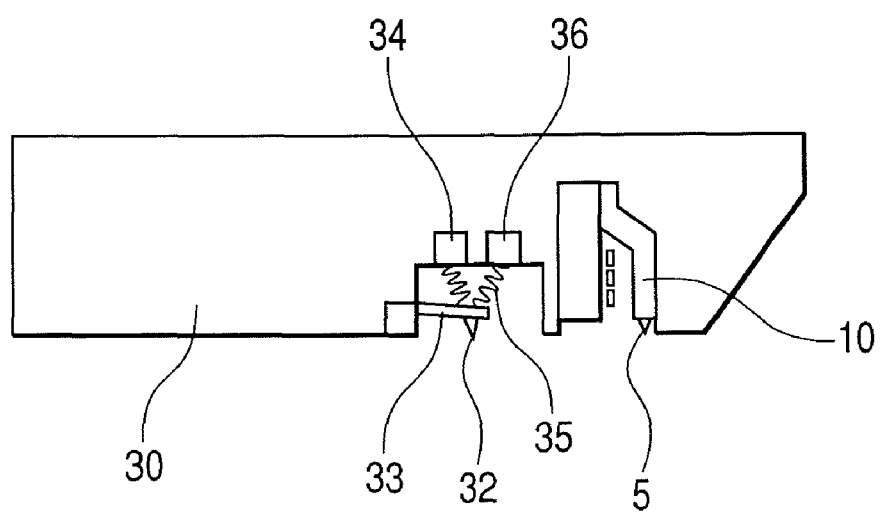
FIG. 8 is another diagram for showing the slider 30.

FIG. 8 shows an example in which the slider 30 is provided with a magnetic probe 32 used as a magnetization reading means. The magnetic probe 32 is provided at the tip of a cantilever 33. As well known as a magnetic force microscope (MFM), the displacement quantity of the magnetic probe 32 changes according to the magnetizing direction of the object medium, since a force working on the probe 32 is varied between the magnetizing directions of the object medium.

The displacement quantity of the magnetic probe 32 is output from a semiconductor laser 34 with use of an optical lever system and the laser beam 35 reflected from the back side of the cantilever 33 is read to read the magnetizing direction of the object medium according to a detected intensity change.

In this embodiment, because the medium has a ferromagnetic pinned layer 26, the magnetizing direction of the lowly coercive ferromagnetic layer 1 is fixed firmly in one direction, that is, in parallel or in antiparallel to the magnetizing direction of the ferromagnetic pinned layer 26 while no magnetic field 6 is applied from the magnetic pole 10. Thus it is possible to reduce the reading noise caused by the magnetization of the lowly coercive ferromagnetic layer 1 upon reading the magnetizing direction of the high coercive ferromagnetic layer 3.

Fourth Embodiment

Figure 9:
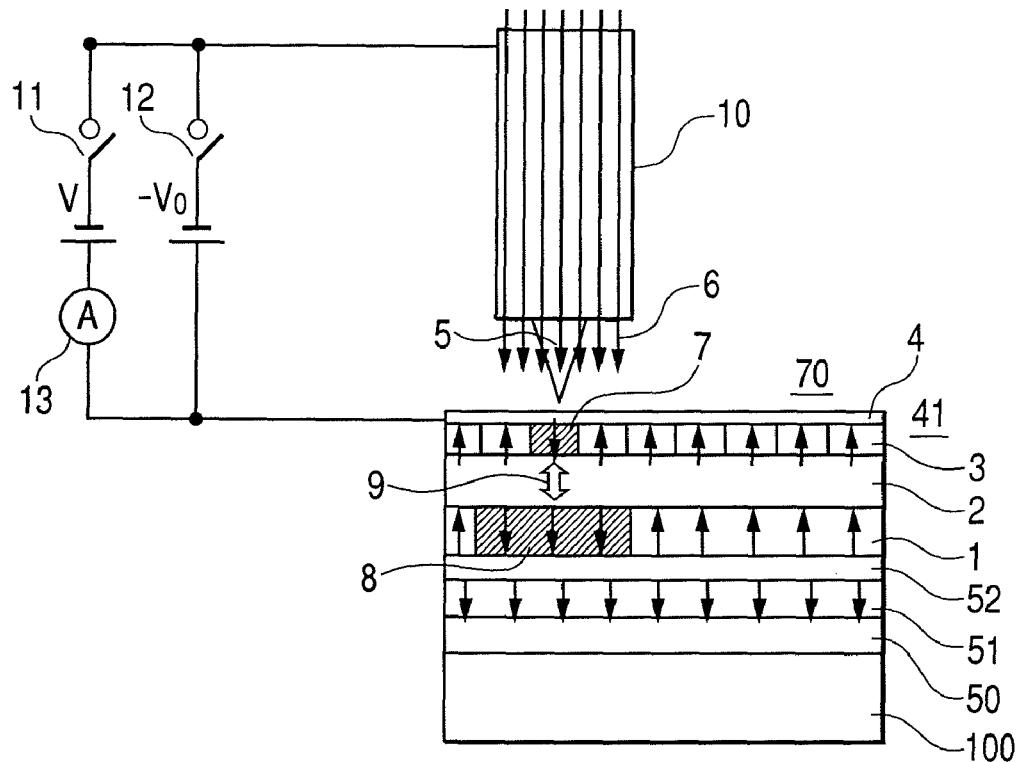
FIG. 9 is a diagram for showing configurations of a magnetic recording medium 70, as well as a metal probe 5 and a magnetic pole 10 provided so as to face the medium 70 respectively in a fourth embodiment.

As shown in FIG. 9, a magnetic recording medium 70 in this fourth embodiment consists of an antiferromagnetic layer 50, a ferromagnetic layer 51, a nonmagnetic layer 52, a lowly coercive ferromagnetic layer 1, a nonmagnetic layer 2, a high coercive ferromagnetic layer 3, and a protection film 4 that are all stacked sequentially as a multilayer film 41 on a substrate 100. The medium 70 is arranged so that a voltage $-V_0$ can be applied between a metal probe 5 and a multilayer film 41.

The protection film 4 is made of, for example, a nonmagnetic matter. The antiferromagnetic layer 50 works to fix the magnetization of the ferromagnetic layer 51 in one direction, that is, perpendicularly to the film surface.

An exchange interaction works between the ferromagnetic layer 51 and the lowly coercive ferromagnetic layer 1, so that the lowly coercive ferromagnetic layer 1 is magnetized fixedly in parallel or in antiparallel to the magnetization of the ferromagnetic layer 51, that is, perpendicularly to the film surface.

Here, it is also possible to provide the medium 70 with an antiferromagnetic layer 50 so as to come in directly contact with the lowly coercive ferromagnetic layer 1 and fix the magnetizing direction of the lowly coercive ferromagnetic layer 1 in one direction with use of the exchange interaction. In this case, the ferromagnetic layer 51 and the nonmagnetic layer 52 may be omitted.

After this, the metal probe 5 is brought close to the surface of the protection film 4 and the magnetic field 6 is applied to the object layer, then the voltage $-V_0$ is applied between the multilayer film 41 and the metal probe 5.

Here, the applied magnetic field 6 is larger enough than the coercivity of the lowly coercive ferromagnetic layer 1 obtained by the exchange interaction, so that applying the magnetic field 6 causes the lowly coercive ferromagnetic layer 1 to be magnetized perpendicularly to the film surface.

At this time, just like the first embodiment, the electrons around the Fermi level in the multilayer film 41 are kept therein and work to form quantum well states. If the metal probe 5 is brought close to the surface of the protection film 4 and the switch 12 is turned on to apply the voltage $-V_0$ to the metal probe at this time, the image potentials of the protection film 4 and the metal probe 5 are put one upon the other, thereby the effective potential that keeps the quantum well electrons in the multilayer film 41 changes.

Upon the change of the electrons keeping potential on the surface of the protection film 4, the phase boundary condition for keeping the quantum well electrons changes, thereby the energy level of the quantum well electrons also changes. This change of the quantum well level energy causes the magnetic exchange interaction that works between the high coercive ferromagnetic layer 3 and the lowly coercive ferromagnetic layer 1 to change, thereby an exchange magnetic field ($H_E$) is induced.

In this case, however, the film thickness of the nonmagnetic layer 2 is set here so that the magnetic exchange interaction that works between the ferromagnetic layers 1 and 3 becomes almost 0 while no electric field is applied. Here, applying both the magnetic field H from external and the voltage $-V_0$ from the metal probe makes it possible to write a magnetizing direction in the high coercive ferromagnetic layer 3 that satisfies $Hc_2<H+H_E$; the external magnetic field H cannot write any magnetizing direction in the high coercive ferromagnetic layer 3 only-by itself.

Because the high coercive ferromagnetic layer 3 has a coercive force due to its magnetic anisotropy, the written magnetizing direction is held as is even when the metal probe 5 and the external magnetic field are excluded here.

When inverting the magnetizing direction of the high coercive ferromagnetic layer 3, the external magnetic field applying direction is inverted, then the same polarity voltage $-V_0$ is applied again to the layer 3. Here, the applied magnetic field H can align the magnetizing direction of the lowly coercive ferromagnetic layer 1 to the direction of the applied magnetic field, but it cannot align the magnetizing direction of the high coercive ferromagnetic layer 3 to the direction only by itself.

If the voltage $-V_0$ is applied to the object layer by turning on the switch 12, an exchange magnetic field is induced so that the magnetizing directions of the lowly coercive ferromagnetic layer 1 and the high coercive ferromagnetic layer 3 are arranged in parallel to each other, thereby an $H+H_E$ magnetic field is applied to the high coercive ferromagnetic layer 3. Thus the magnetizing direction of the layer 3 can be inverted.

In this embodiment, because the recording medium has a ferromagnetic pinned layer 51, the magnetizing direction of the lowly coercive ferromagnetic layer 1 is fixed firmly in one direction, that is, in parallel or in antiparallel to the magnetizing direction of the layer 51 even while the magnetic field is applied to the object layer from the magnetic pole 10. Consequently, the read noise caused by the magnetization of the lowly coercive ferromagnetic layer 1 can be reduced upon reading the magnetizing direction of the high coercive ferromagnetic layer 3.

Fifth Embodiment

Figure 10:
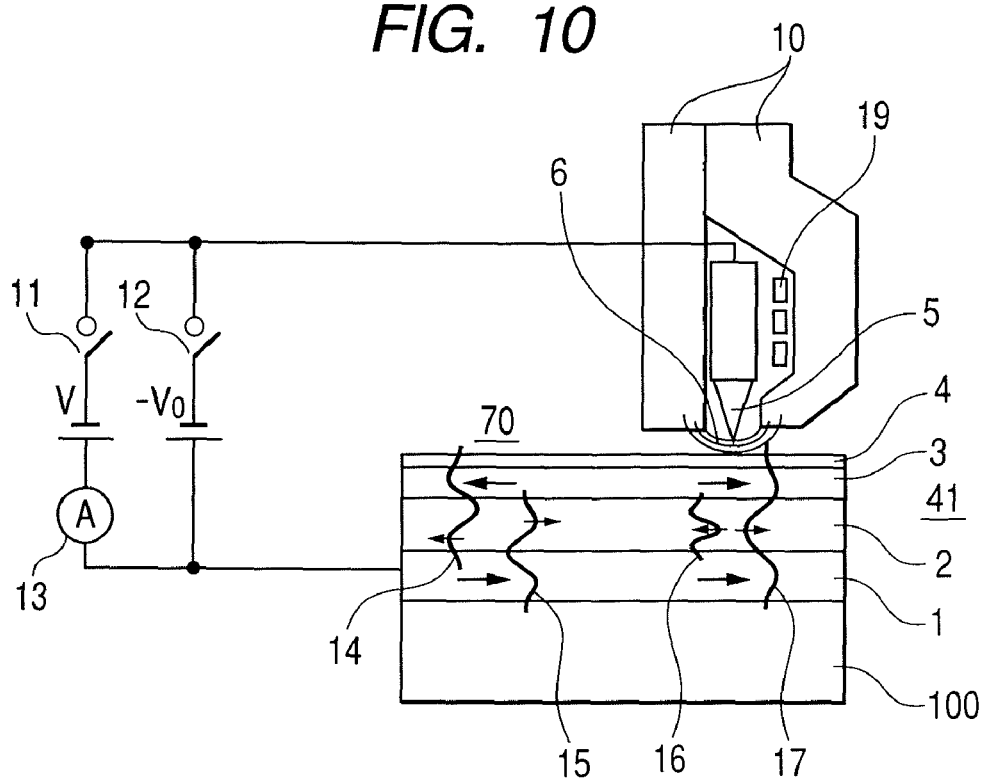
FIG. 10 is a diagram for showing configurations of a magnetic recording medium 70, as well as a metal probe 5 and a magnetic pole 10 provided so as to face the medium 70 respectively in a fifth embodiment.

As shown in FIG. 10, a magnetic recording medium 70 in this fifth embodiment consists of a lowly coercive ferromagnetic layer 1, a nonmagnetic layer 2, a high coercive ferromagnetic layer 3, and a protection film 4 that are all stacked sequentially as a multilayer film on a substrate 100. The magnetizing directions of the ferromagnetic layers 1 and 3 are in parallel to each other in the longitudinal direction of the film surface. A voltage $-V_0$ can be applied between a metal probe 5 and a multilayer film 41.

The protection film 4 is made of, for example, such a nonmagnetic matter as Au. Here, the lowly coercive ferromagnetic layer 1 and the high coercive ferromagnetic layer 3 are magnetized in the longitudinal direction of the film. After this, the metal probe 5 is brought close to the surface of the protection film 4, then a magnetic field 6 is applied to the object layer from the magnetic pole 10 and the voltage $-V_0$ is applied between the multilayer film 41 and the metal probe 5.

At this time, just like the first embodiment, the electrons around the Fermi level in the multilayer film 41 are kept therein and work to form quantum well states. If the metal probe 5 is brought close to the surface of the protection film 4 and the switch 12 is turned on to apply the voltage $-V_0$ to the metal probe 5 here, the image potentials of the protection film 4 and the metal probe 5 are put one upon the other, thereby the effective potential that keeps the quantum well electrons in the layer 41 changes.

Upon the change of the electrons keeping potential on the surface of the protection film 4, the phase boundary condition for keeping the quantum well electrons in the layer 41 also changes, thereby the energy level of the quantum well electrons changes. Because of this change of the quantum well level energy, the magnetic exchange interaction between the high coercive ferromagnetic layer 3 and the lowly coercive ferromagnetic layer 1 changes, thereby an exchange magnetic field ($H_E$) is induced.

In this case, however, the film thickness of the nonmagnetic layer 2 is set so that the magnetic exchange interaction that works between the ferromagnetic layers becomes almost 0 while no electric field is applied to the object layer. This makes it possible to write a magnetizing direction in the high coercive ferromagnetic layer 3 that satisfies $Hc_2<H+H_E$ with the magnetic field H applied from external and with the voltage $-V_0$ applied through the metal probe. It has been impossible conventionally that the external magnetic field H writes a magnetizing direction in the high coercive ferromagnetic layer 3 only by itself.

Because the high coercive ferromagnetic layer 3 can have coercivity due to its magnetic anisotropy, the written magnetizing direction is held as is even when the metal probe 5 and the external magnetic field are excluded here.

When inverting the written magnetizing direction in the high coercive ferromagnetic layer 3, the external magnetic field applying direction is inverted and the same polarity voltage $-V_0$ is applied again to the layer 3. Here, the applied magnetic field H can align the magnetizing direction of the lowly coercive ferromagnetic layer 1 to the direction of the applied magnetic field, but cannot align the magnetizing direction of the high coercive ferromagnetic layer 3 to the direction.

Then, the voltage $-V_0$ is applied to the object layer by turning on the switch 12. As a result, an exchange magnetic field is induced so as to arrange the magnetizing directions of the lowly coercive ferromagnetic layer 1 and the high coercive ferromagnetic layer 3 in parallel to each other, thereby an $H+H_E$ magnetic field is applied to the high coercive ferromagnetic layer 3 and the magnetizing direction of the layer 3 is inverted.

Sixth Embodiment

Figure 11:
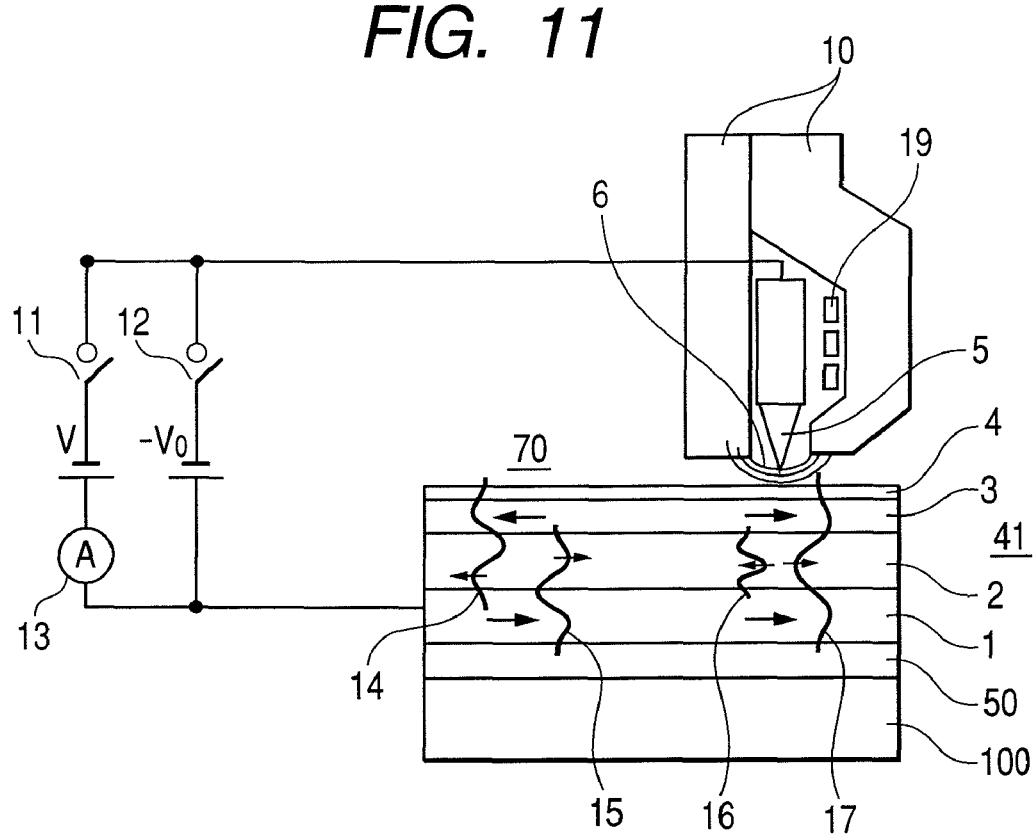
FIG. 11 is a diagram for showing configurations of a magnetic recording medium 70, as well as a metal probe 5 and a magnetic pole 10 provided so as to face the medium 70 respectively in a sixth embodiment.

As shown in FIG. 11, a magnetic recording medium 70 in this sixth embodiment consists of an antiferromagnetic layer 50, a lowly coercive ferromagnetic layer 1, a nonmagnetic layer 2, a high coercive ferromagnetic layer 3, and a protection film 4 that are all stacked sequentially as a multilayer film 41 on a substrate 100. The magnetizing directions of the ferromagnetic layers 1 and 3 are in parallel to the longitudinal direction of the film surface. It is arranged here that the voltage $-V_0$ can be applied between a metal probe 5 and the multilayer film 41.

The protection film 4 is made of, for example, such a nonmagnetic matter as Au. Here, the magnetizing direction of the lowly coercive ferromagnetic layer 1 is fixed in the longitudinal direction of the film due to the exchange interaction between the antiferromagnetic layer 50 and the lowly coercive ferromagnetic layer 1.

Here, just like the fourth embodiment, a ferromagnetic layer and a nonmagnetic layer may further be provided between the antiferromagnetic layer 50 and the lowly coercive ferromagnetic layer 1 and the magnetizing direction of the lowly coercive ferromagnetic layer 1 may be fixed in one direction with use of the exchange interaction.

After this, the metal probe 5 is brought close to the surface of the protection film 4 and a magnetic field 6 is applied to the object layer from the magnetic pole 10 and the voltage $-V_0$ is applied between the multilayer film 41 and the metal probe 5.

Here, the applied magnetic field 6 is larger enough than the coercivity of the lowly coercive ferromagnetic layer 1 obtained by the exchange interaction, so that applying the magnetic field 6 causes the lowly coercive ferromagnetic layer 1 to be magnetized in the direction of the applied magnetic field within the film surface.

At this time, just like the first embodiment, the electrons around the Fermi level in the multilayer film 41 are kept therein and work to form quantum well states. Then, the metal probe 5 is brought close to the surface of the protection film 4 and the switch 12 is turned on to apply the voltage $-V_0$ to the metal probe 5. As a result, the image potentials of the protection film 4 and the metal probe 5 are put one upon the other, thereby the effective potential that keeps the quantum well electrons in the layer changes.

Upon the change of the electrons keeping potential on the surface of the protection film 4, the phase boundary condition for keeping the quantum well electrons also changes, thereby the energy level of the quantum well electrons changes. Because of this change of the quantum well level energy, the magnetic exchange interaction between the high coercive ferromagnetic layer 3 and the lowly coercive ferromagnetic layer 1 changes, thereby an exchange magnetic field ($H_E$) is induced.

In this case, the film thickness of the nonmagnetic layer 2 is set so that the magnetic exchange interaction that works between the ferromagnetic layers 1 and 3 becomes almost 0 when no electric field is applied. This makes it possible to write a magnetizing direction in the high coercive ferromagnetic layer 3 that satisfies $Hc_2<H+H_E$ with the magnetic field H applied from external and with the voltage $-V_0$ applied through the metal probe 5. It has been impossible conventionally that the external magnetic field H writes a magnetizing direction in the high coercive ferromagnetic layer 3 only by itself.

Because the high coercive ferromagnetic layer 3 can have coercivity due to its magnetic anisotropy, the written magnetizing direction is held as is even when the metal probe 5 and the external magnetic field are excluded here.

When inverting the magnetizing direction of the high coercive ferromagnetic layer 3, it is just required to invert the external magnetic field applying direction and apply the same polarity voltage $-V_0$ again to the object layer. Here, the applied magnetic field H aligns the magnetizing direction of the lowly coercive ferromagnetic layer 1 to the direction of the applied magnetic field, but it does not align the magnetizing direction of the high coercive ferromagnetic layer 3 to the direction.

After that, the voltage $-V_0$ is applied to the metal probe 5 by turning on the switch 12. As a result, an exchange magnetic field is induced so as to arrange the magnetizing directions of the lowly coercive ferromagnetic layer 1 and the high coercive ferromagnetic layer 3 in parallel to each other, thereby the $H+H_E$ magnetic field is applied to the high coercive ferromagnetic layer 3. Then, the magnetizing direction of the layer 3 is inverted.

In this embodiment, because the recording medium has a ferromagnetic pinned layer 50, the magnetizing direction of the lowly coercive ferromagnetic layer 1 is fixed firmly in one direction within the film surface. Thus the read noise caused by the magnetization of the lowly coercive ferromagnetic layer 1 is reduced upon reading the magnetizing direction of the high coercive ferromagnetic layer 3.

Seventh Embodiment

Figure 12:
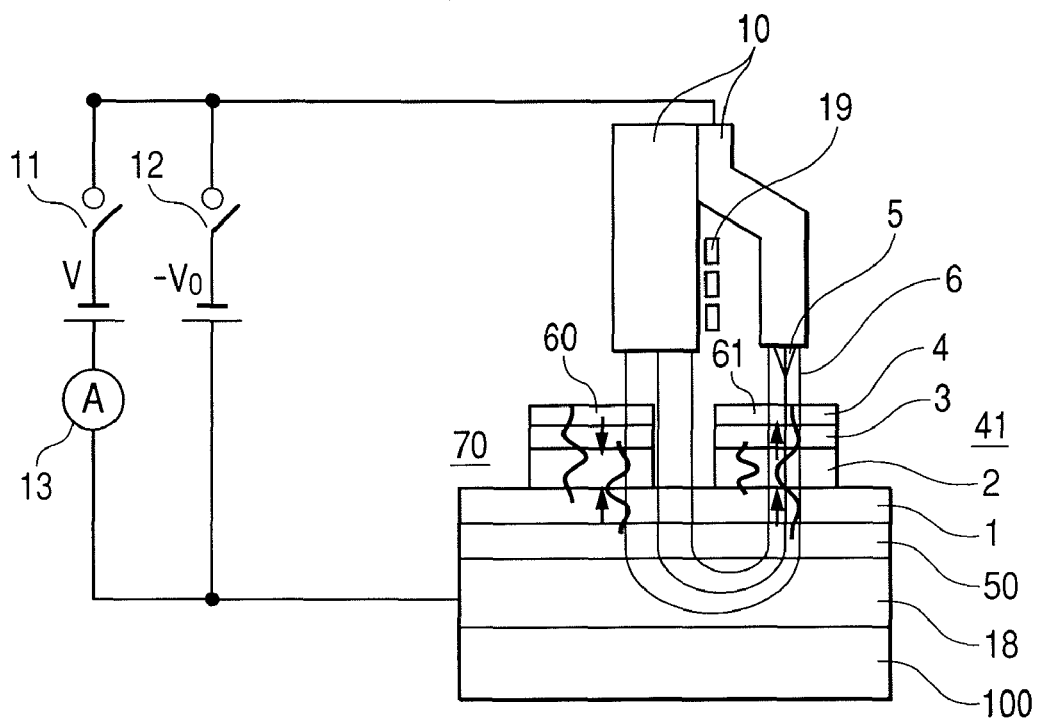
FIG. 12 is a diagram for showing configurations of a magnetic recording medium 70, as well as a metal probe 5 and a magnetic pole 10 provided so as to face the medium 70 respectively in a seventh embodiment.

As shown in FIG. 12, a magnetic recording medium 70 in this seventh embodiment consists of a soft magnetic layer 18, an antiferromagnetic layer 50, a lowly coercive ferromagnetic layer 1, a nonmagnetic layer 2, a high coercive ferromagnetic layer 3, and a protection film 4 that are all stacked sequentially and formed as a multilayer film 41 on a substrate 100. Here, it is arranged that the voltage $-V_0$ can be applied between a metal probe 5 and the multilayer film 41.

The protection film 4 is made of, for example, such a nonmagnetic matter as Au. Here, the magnetizing direction of the lowly coercive ferromagnetic layer 1 is fixed in one direction due to the antiferromagnetic layer 50. Also in this case, just like the fourth embodiment, a ferromagnetic layer and a nonmagnetic layer may be provided between the antiferromagnetic layer 50 and the lowly coercive ferromagnetic layer 1 and the magnetizing direction of the lowly coercive ferromagnetic layer 1 may be fixed in one direction with use of the exchange interaction.

The lowly coercive ferromagnetic layer 1 may be magnetized in the longitudinal direction of the film when no magnetic field is applied. The protection film 4, the highly coercive ferromagnetic layer 3, and the nonmagnetic layer 2 are patterned like dots as shown in FIG. 12 to form dot-like columnar nanopillars 60 and 61 through resist patterning, ion milling, and resist removal processes.

Figure 13:
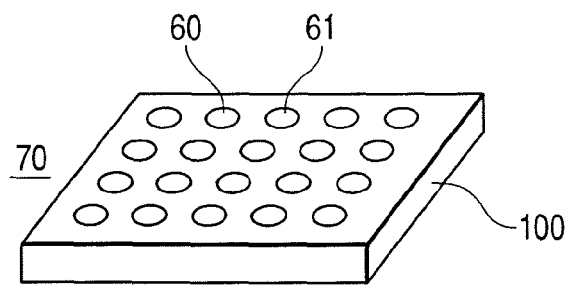
FIG. 13 is a diagram for showing an example of patterning the magnetic recording medium 70 like dots in the seventh embodiment.

The patterning may be done up to the antiferromagnetic layer 50. However, patterning of the nonmagnetic layer 2, the high coercive ferromagnetic layer 3, and the antiferromagnetic layer 50 may be omitted here. The number of the nanopillars may be increased. Each pillar is assumed as a unit for storing information. FIG. 13 shows a bird's eye view of some of this nanopillars.

Figure 14:
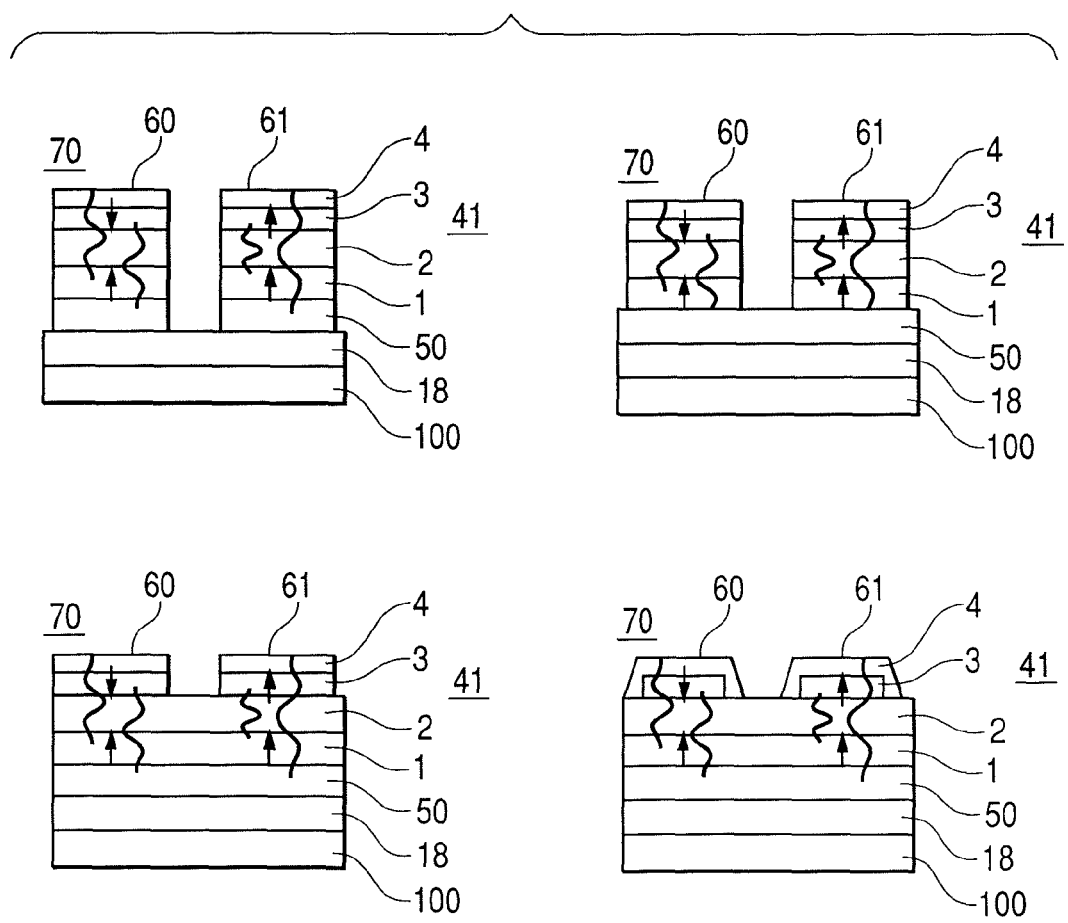
FIG. 14 is a diagram for showing another example of patterning the magnetic recording medium 70 like dots in the seventh embodiment.

FIG. 14 shows an example of how the other nanopillars are formed. Each space between nanopillars may be filled with such an insulation material as alumina or such semiconductor as Si or the like.

After this, for example, the metal probe 5 is brought close to the surface of the protection film 4 of the nanopillar 61 and a magnetic field 6 is applied to the object film from external, then the voltage $-V_0$ is applied between the multilayer film 41 and the metal probe 5. Here, the applied magnetic field 6 is larger enough than the coercivity of the lowly coercive ferromagnetic layer 1 due to the exchange interaction, thereby applying of the magnetic field 6 causes the lowly coercive ferromagnetic layer 1 to be magnetized in the direction of the applied magnetic field.

At this time, just like the first embodiment, the electrons around the Fermi level in the multilayer film 41 are kept in the multilayer film 41 of the nanopillar 61 and work to form quantum well states. Then, the metal probe 5 is brought close to the surface of the protection film 4 and the switch 12 is turned on to apply the voltage $-V_0$ to the metal probe 5. As a result, the image potentials of the protection film 4 and the metal probe 5 are put one upon the other, thereby the effective potential that keeps the quantum well electrons in the layer 41 changes.

Upon the change of the electrons keeping potential on the surface of the protection film 4, the phase boundary condition for keeping the quantum well electrons also changes, thereby the energy level of the quantum well electrons changes. Because of this change of the quantum well level energy, the magnetic exchange interaction between the high coercive ferromagnetic layer 3 and the lowly coercive ferromagnetic layer 1 changes, thereby an exchange magnetic field ($H_E$) is induced.

Also in this case, the film thickness of the nonmagnetic layer 2 is set so that the magnetic exchange interaction that works between the ferromagnetic layers 1 and 3 becomes almost 0 while no electric field is applied. Consequently, at this time a magnetizing direction can be written in the high coercive ferromagnetic layer 3 that satisfies $Hc_2 < H + H_E$ with the magnetic field H applied from external and with the voltage $-V_0$ applied through the metal probe 5. It has been impossible conventionally that the external magnetic field H writes a magnetizing direction in the high coercive ferromagnetic layer 3 only by itself.

Because the high coercive ferromagnetic layer 3 can have coercivity due to its magnetic anisotropy, the written magnetizing direction is held as is even when the metal probe 5 and the external magnetic field are excluded here.

When inverting the magnetizing direction of the high coercive ferromagnetic layer 3, it is just required to invert the external magnetic field applying direction and apply the same polarity voltage $-V_0$ again to the object layer. Here, the applied magnetic field H aligns the magnetizing direction of the lowly coercive ferromagnetic layer 1 to the direction of the applied magnetic field, but it does not align the magnetizing direction of the high coercive ferromagnetic layer 3 to the direction.

After that, the voltage $-V_0$ is applied to the metal probe 5 by turning on the switch 12. As a result, an exchange magnetic field is induced so as to arrange the magnetizing directions of the lowly coercive ferromagnetic layer 1 and the high coercive ferromagnetic layer 3 in parallel to each other, then the $H + H_E$ magnetic field is applied to the high coercive ferromagnetic layer 3. Thus the magnetizing direction of the layer 3 is inverted.

In this embodiment, because the recording medium has a ferromagnetic pinned layer 50, the magnetizing direction of the lowly coercive ferromagnetic layer 1 is fixed firmly in one direction within the film surface. Consequently, the read noise caused by the magnetization of the lowly coercive ferromagnetic layer 1 is reduced upon reading the magnetizing direction of the high coercive ferromagnetic layer 3.

Eighth Embodiment

Figure 15:
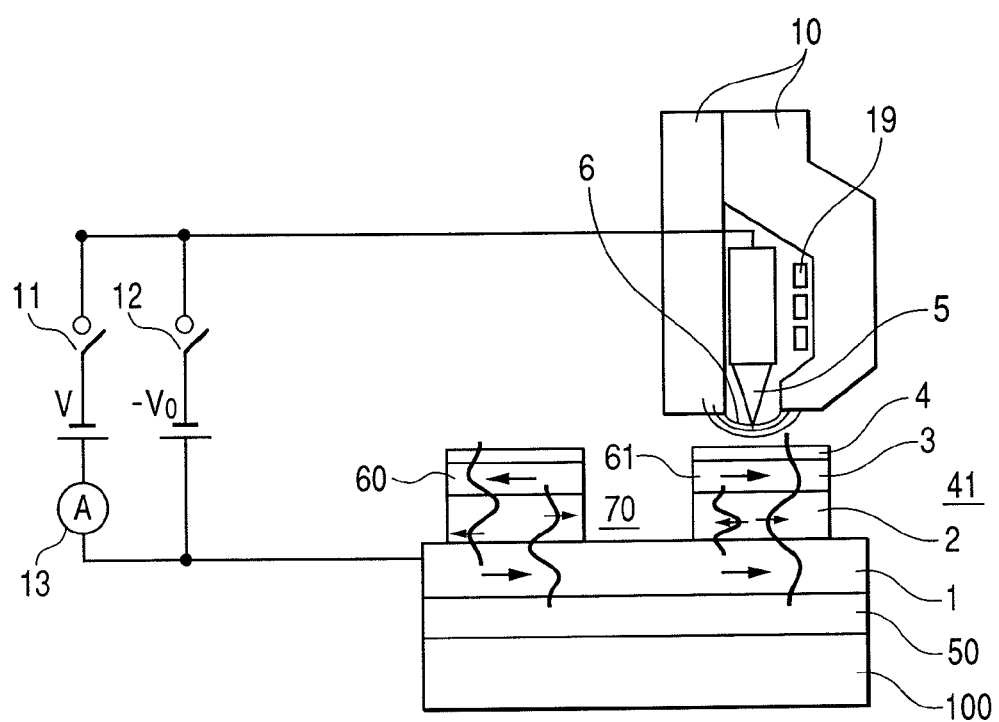
FIG. 15 is a diagram for showing configurations of a magnetic recording medium 70, as well as a metal probe 5 and a magnetic pole 10 provided so as to face the medium 70 respectively in an eighth embodiment.

As shown in FIG. 15, a magnetic recording medium in this eighth embodiment consists of an antiferromagnetic layer 50, a lowly coercive ferromagnetic layer 1, a nonmagnetic layer 2, a high coercive ferromagnetic layer 3, and a protection film 4 that are all stacked sequentially to be formed as a multilayer film 41 on a substrate 100. It is arranged here that the voltage $-V_0$ can be applied between a metal probe 5 and the multilayer film 41. The protection film 4 is made of, for example, such a nonmagnetic matter as Au. The magnetizing direction of the lowly coercive ferromagnetic layer 1 is fixed in one direction due to the antiferromagnetic layer 50.

Also in this case, just like the fourth embodiment, a ferromagnetic layer and a nonmagnetic layer may be provided between the antiferromagnetic layer 50 and the lowly coercive ferromagnetic layer 1 and the magnetizing direction of the lowly coercive ferromagnetic layer 1 may be fixed in one direction with use of the exchange interaction. Unlike the seventh embodiment, the high coercive ferromagnetic layer 3 is magnetized in the longitudinal direction of the film.

As shown in FIG. 15, the protection film 4, the highly coercive ferromagnetic layer 3, and the nonmagnetic layer 2 are patterned like dots to form dot-like columnar nanopillars 60 and 61 through resist patterning, ion milling, and resist removal processes.

The patterning may be done up to the antiferromagnetic layer 50. However, patterning of the nonmagnetic layer 2, the high coercive ferromagnetic layer 3, and the antiferromagnetic layer 50 may be omitted. The number of the nanopillars may be increased. Each pillar is assumed as a unit for storing information just like the seventh embodiment.

Figure 16:
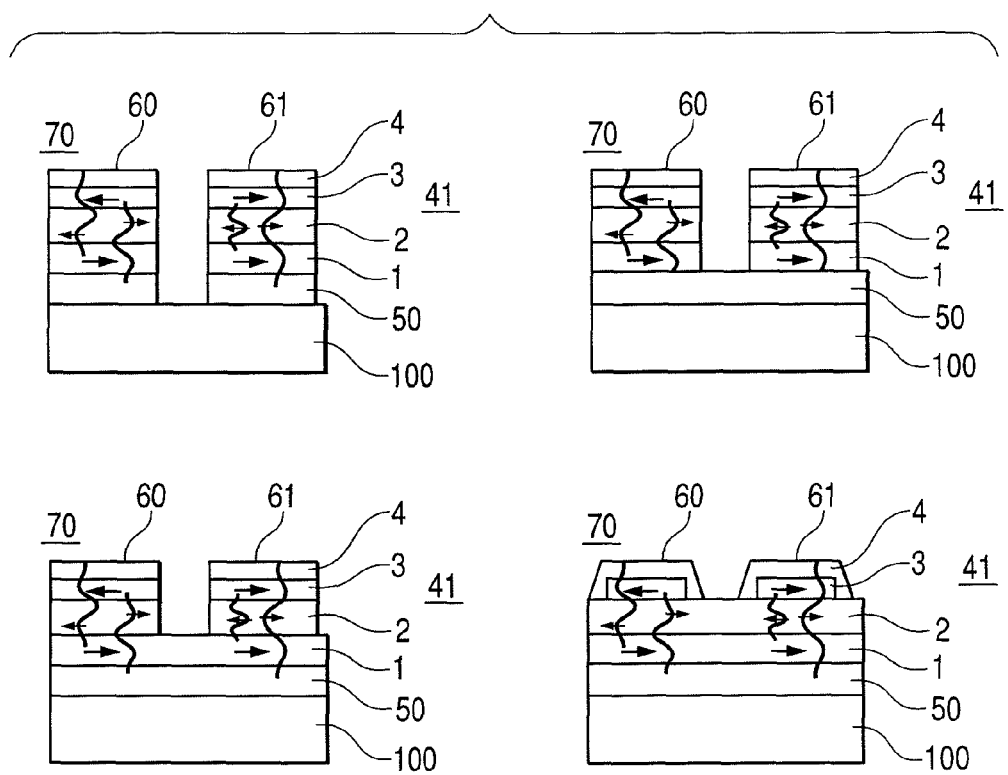
FIG. 16 is a diagram for showing an example of patterning the magnetic recording medium 70 like dots in the eighth embodiment.

FIG. 16 shows an example of how another nanopillar is formed. Each space between nanopillars may be filled with such an insulation material as alumina or such semiconductor as Si or the like.

After this, for example, the metal probe 5 is brought close to the surface of the protection film 4 of the nanopillar 61 and a magnetic field 6 is applied to the object layer from external, then the voltage $-V_0$ is applied between the multilayer film 41 and the metal probe 5.

Here, the applied magnetic field 6 is larger enough than the coercivity of the lowly coercive ferromagnetic layer 1 due to the exchange interaction. Thus applying the magnetic field 6 causes the lowly coercive ferromagnetic layer 1 to be magnetized in the direction of the applied magnetic field. At this time, just like the first embodiment, the electrons around the Fermi level in the multilayer film of the nanopillar 61 are kept therein and work to form quantum well states. After that, the metal probe 5 is brought close to the surface of the protection film 4 and the switch 12 is turned on to apply the voltage $-V_0$ to the metal probe 5. Then, the image potentials of the protection film 4 and the metal probe 5 are put one upon the other, thereby the effective potential that keeps the quantum well electrons in the layer 41 changes.

Upon the change of the electrons keeping potential on the surface of the protection film 4, the phase boundary condition for keeping the quantum well electrons also changes, thereby the energy level of the quantum well electrons changes. Because of this change of the quantum well level energy, the magnetic exchange interaction between the high coercive ferromagnetic layer 3 and the lowly coercive ferromagnetic layer 1 changes, thereby an exchange magnetic field $(H_E)$ is induced.

Also in this case, the film thickness of the nonmagnetic layer 2 is set so that the magnetic exchange interaction that works between the ferromagnetic layers becomes almost 0 when no electric field is applied. This makes it possible to invert a magnetizing direction of the high coercive ferromagnetic layer 3 that satisfies $Hc_2 < H + H_E$ with the magnetic field H applied from external and with the voltage $-V_0$ applied through the metal probe. It has been impossible conventionally that the external magnetic field H writes a magnetizing direction in the high coercive ferromagnetic layer 3 only by itself.

Because the high coercive ferromagnetic layer 3 can have coercivity due to its magnetic anisotropy, the written magnetizing direction is held as is even when the metal probe 5 and the external magnetic field are excluded here.

When inverting the magnetizing direction of the high coercive ferromagnetic layer, it is just required to invert the external magnetic field applying direction and apply the same polarity voltage $-V_0$ again to the object layer. Here, the applied magnetic field H aligns the magnetizing direction of the lowly coercive ferromagnetic layer 1 to the direction of the applied magnetic field, but it does not align the magnetizing direction of the high coercive ferromagnetic layer 3 to the direction.

Then, the voltage $-V_0$ is applied to the object layer by turning on the switch 12. As a result, an exchange magnetic field is induced so as to arrange the magnetizing directions of the lowly coercive ferromagnetic layer 1 and the high coercive ferromagnetic layer 3 in parallel to each other. Then, the $H + H_E$ magnetic field is applied to the high coercive ferromagnetic layer 3. Thus the magnetizing direction of the layer 3 is inverted.

In this embodiment, because the recording medium has a ferromagnetic pinned layer 50, the magnetizing direction of the lowly coercive ferromagnetic layer 1 is fixed firmly in one direction within the film surface. Therefore, the read noise caused by the magnetization of the lowly coercive ferromagnetic layer 1 is reduced upon reading the magnetizing direction of the high coercive ferromagnetic layer 3.

Ninth Embodiment

Figure 17:
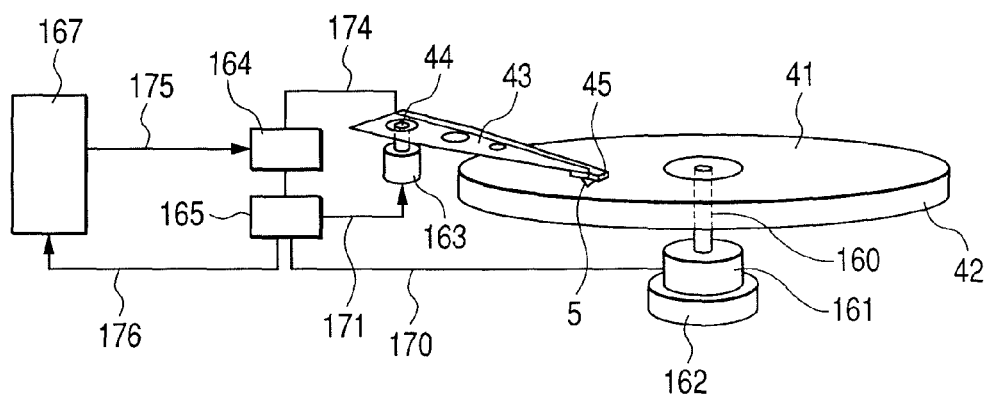
FIG. 17 is a diagram for showing a configuration of a rotating recording medium in a ninth embodiment.

FIG. 17 shows a schematic diagram of a configuration of a magnetic recording system in this ninth embodiment. The multilayer film 41 described in each of the above embodiments, for example, consists of an antiferromagnetic layer 50, a lowly coercive ferromagnetic layer 1, a nonmagnetic layer 2, a highly coercive ferromagnetic layer 3, and a protection layer 4 that are stacked sequentially to be formed as a disc-like recording medium 42.

Figure 18:
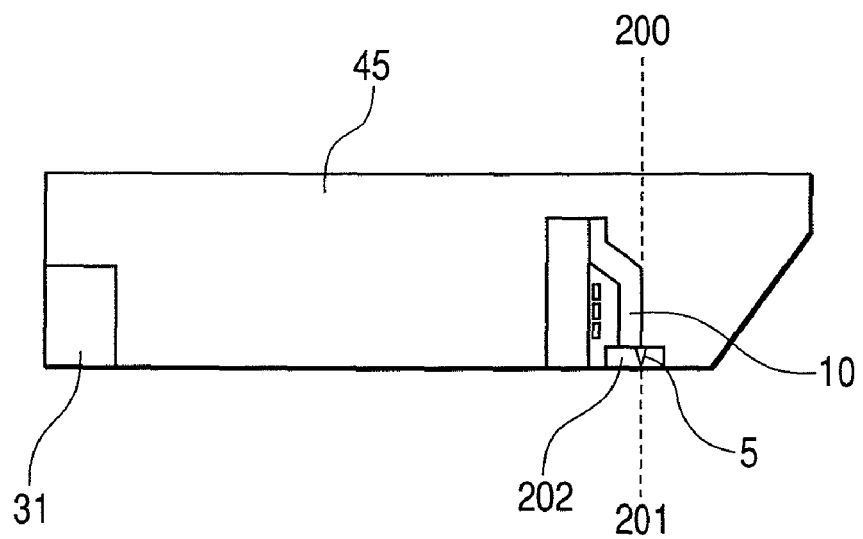
FIG. 18 is a diagram for showing a configuration of a slider in the ninth embodiment.

A metal probe 5 provided so as to face the multilayer film 41 is attached to a lower portion of a slider provided at the tip of an arm 43. As shown in FIG. 18, the metal probe 5 may be embedded in the slider 45.

Figure 19:
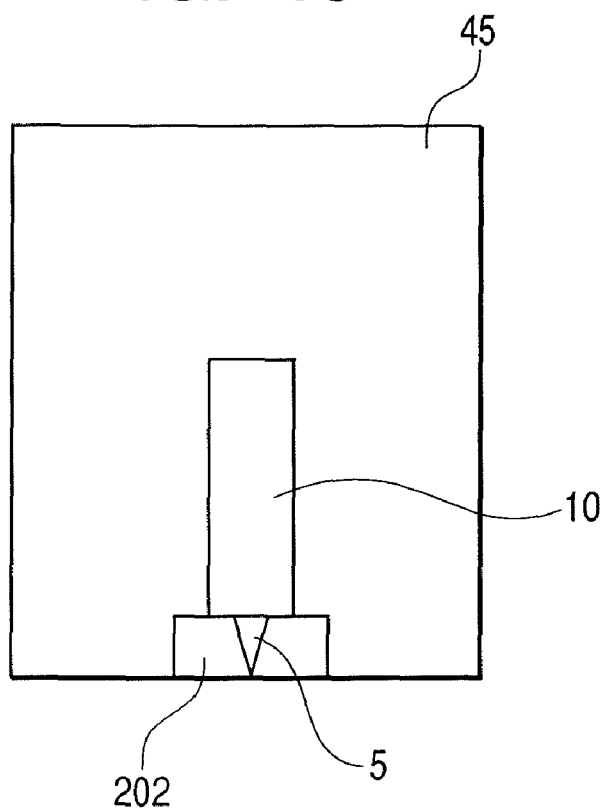
FIG. 19 is another diagram for showing the configuration of the slider in the ninth embodiment.

FIG. 19 shows the metal probe 5 and the magnetic pole 10 at cross sections 200 to 201 of the slider 45 shown in FIG. 18. Here, the metal probe 5 is formed as a metal film tapered in a direction facing the multilayer film 41. The metal film probe 5 is embedded in an insulation film 202 formed in the slider 45.

In FIG. 17, reference numeral 44 denotes a rotation supporting shaft of the arm 43. The position of the arm 43 is controlled by an arm control motor 163. The disc-like recording medium 42 is rotated around a rotary shaft 160 by a spindle motor 161, then the slider 4 floats by a predetermined distance just like an ordinary magnetic disk. Consequently, the metal probe 5 comes to be disposed to face the multilayer film 41 at almost a fixed distance therebetween.

A voltage and a magnetic field are applied to the surface of the substrate of the disc-like recording medium and between the substrate surface and the metal probe 5 through the arm 43 respectively, thereby information can be recorded on the medium 41 as a domain of a magnetizing direction as described in the first to eighth embodiments.

Here, the multilayer film 41, the rotary shaft 160, and the spindle motor 161 supported on an insulated supporting base 162 are conductive and they are connected to each another electrically. Voltage applying and tunnel current detection can be made through a signal current line 170 connected to the spindle motor 161 or rotary shaft 160.

The spindle motor 161 and the rotary shaft 160 may be insulated from each other electrically in case where the signal current line 170 is led from a part of the rotary shaft 160.

Written data is output to a voltage applying unit 164 from a data signal processing unit 167 as a write control signal 175. The voltage applying unit 164 applies a probe voltage 174 between the probe 5 and the multilayer film 41. Magnetization information can be read according to the size of a tunnel current flowing between the metal probe 5 and the disc-like recording medium 42.

This is because the quantum well state differs depending on whether the relative magnetizing directions of two ferromagnetic layers are in parallel or in antiparallel to each other and depending on the quantum level energy, that is, whether the state density in the object recording region is in parallel or in antiparallel to the magnetizing direction. This state density difference is read according to a change of the tunnel current flowing between the metal probe 5 and the disc-like recording medium 42 to detect the object magnetizing direction.

Means for flowing a tunnel current and means for detecting the current may be just required to apply a voltage between the metal probe 5 and the multilayer film 41 and to detect a current flowing according to the applied voltage. To detect magnetization information, as described in the third embodiment, magnetic resistance changes caused by a GMR element, a TMR element, or the like, as well as magnetic probe displacement quantity may be used.

The signal current 170 is read by a current amplification detector/servo signal generator 165. The read data signal 176 is processed by a data signal processor 167 and input/output as needed.

The current amplification detector/servo signal generator 165 can generate a servo signal from a detected servo pattern to control the position of the arm 43 on the subject track.

As described above, by controlling the potential of the metal probe 5 with respect to the multilayer film 41 according to a signal to be recorded and detecting a magnetizing direction written with a tunnel current or the like, a magnetic recording system can be realized just like ordinary magnetic disk drives.

Tenth Embodiment

Figure 20:
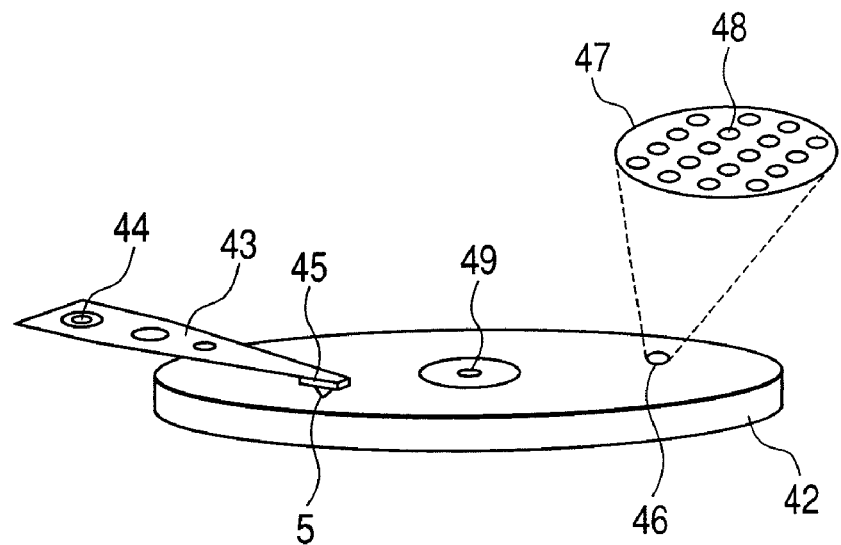
FIG. 20 is a diagram for showing a configuration of a rotating recording medium in a tenth embodiment.

FIG. 20 shows a schematic perspective diagram of a configuration of a magnetic recording system in this tenth embodiment of the present invention. A disc-like recording medium 42 shown in FIG. 20 consists of many nanopillars 60 and 61, each being composed of an antiferromagnetic layer 18, a lowly coercive ferromagnetic layer 1, a nonmagnetic layer 2, a highly coercive ferromagnetic layer 3, and a protection film 4 just like the recording medium shown in FIGS. 14 and 16. Each of those nanopillars 60 and 61 is a recording unit of the recording medium and other components are the same as those in the ninth embodiment.

FIG. 20 shows an explanatory diagram of a nanopillar 48 disposed on a concentric circle around the rotation center 49 in a region 47 enlarged from an area of the disc-like recording medium 42.

The metal probe 5 keeps a constant distance from the disc-like recording medium 42 due to a lifting force generated by the slider attached to the tip of the arm 43. The metal probe 5 can thus write magnetization information in a nanopillar positioned as desired.

On the other hand, magnetization information written in the nanopillar 48 through the metal probe 5 can be read according to changes of the tunnel current and with use of a magnetic resistance element.

Figure 21:
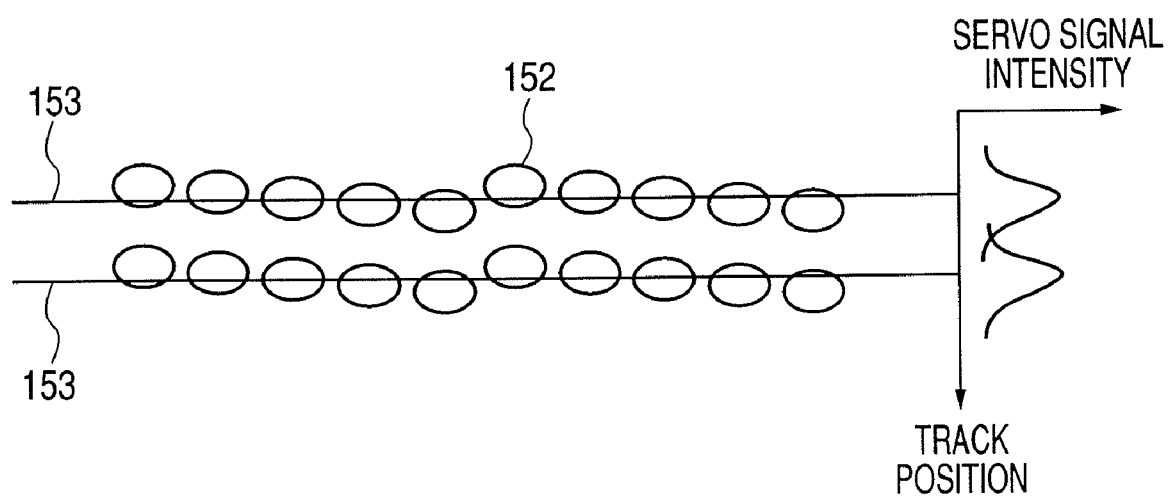
FIG. 21 is a diagram for showing a servo pattern of the rotating recording medium in the tenth embodiment.

FIG. 21 shows how the servo signal intensity depends on the track position in servo nanopillar patterns 152 deviated slightly from the track position 153 respectively.

The servo signal can be represented by resistance changes caused by a tunnel current flowing between the metal probe 5 and the nanopillar 152, as well as by a magnetic resistance element. The track position is controlled with use of this dependency of the servo signal on the track position.

What is claimed is:

1. A magnetic recording system comprising:
    a magnetic recording medium including a substrate, a first ferromagnetic layer formed on said substrate, a nonmagnetic layer formed on said first ferromagnetic layer, and a second ferromagnetic layer formed on said nonmagnetic layer;
    a magnetic pole for applying a magnetic field H to invert a magnetizing direction of said first ferromagnetic layer; and
    means for applying a positive or a negative voltage V between a metallic probe and said magnetic recording medium, wherein a coercivity $Hc_2$ of said second ferromagnetic layer is larger than that $Hc_1$ of said first ferromagnetic layer;

wherein a quantum well level is formed in said nonmagnetic layer formed between said first and second ferromagnetic layers;

wherein said magnetic field H changes said magnetizing direction of said first ferromagnetic layer to a direction of an applied magnetic field;

wherein applying said positive or negative voltage V changes an energy of said quantum well level between said first and second ferromagnetic layers, thereby inducing an exchange magnetic field $H_E$; and wherein said magnetic field H and said exchange magnetic field $H_E$ work together to invert said magnetizing direction of said second ferromagnetic layer.

2. The magnetic recording system according to claim 1, wherein said coercivity $Hc_1$ of said first ferromagnetic layer, said coercivity $Hc_2$ of said second ferromagnetic layer, and said magnetic field H are in a relationship of $Hc_1<H<Hc_2$; and wherein said exchange magnetic field $H_E$ has a relationship of $Hc_2<H+H_E$ with said coercivity $Hc_2$ of said second ferromagnetic layer and said magnetic field H.

3. The magnetic recording system according to claim 2, wherein said exchange magnetic field $H_E$ has a relationship of $H-H_E<Hc_1$ with said coercivity $Hc_1$ of said first ferromagnetic layer and said magnetic field H.

4. The magnetic recording system according to claim 1, wherein said first ferromagnetic layer is formed on an antiferromagnetic layer and magnetization of said first ferromagnetic layer is fixed.

5. The magnetic recording system according to claim 1, wherein said first and second ferromagnetic layers are magnetized in a longitudinal direction respectively.

6. The magnetic recording system according to claim 1, wherein said first and second ferromagnetic layers are magnetized in a direction perpendicular to their film surfaces respectively.

7. The magnetic recording system according to claim 1, wherein said magnetic recording medium further includes:
a third ferromagnetic layer formed between said first ferromagnetic layer and said substrate through a nonmagnetic layer; and
an antiferromagnetic layer formed between said substrate and said third ferromagnetic layer.

8. The magnetic recording system according to claim 1, wherein a magnetic exchange interaction that works between said first and second ferromagnetic layers is almost zero while said positive or negative voltage V is not applied.

9. The magnetic recording system according to claim 1, wherein said positive or negative voltage is applied between the metallic probe and a surface of a magnetized region and said magnetizing direction of each of said ferromagnetic layers is read according to a change of a tunnel current value.

10. A magnetic recording system, comprising:
a magnetic recording medium including a substrate, a first ferromagnetic layer formed on said substrate, a nonmagnetic layer formed on said first ferromagnetic layer, and a second ferromagnetic layer formed on said nonmagnetic layer;
a magnetic pole for applying a magnetic field H to invert a magnetizing direction of said first ferromagnetic layer; and
an electrode for applying a positive or negative voltage V between a metallic probe and said magnetic recording medium, wherein a coercivity $Hc_2$ of said second ferromagnetic layer is larger than that $Hc_1$ of said first ferromagnetic layer;

wherein said magnetic field H changes said magnetizing direction of said first ferromagnetic layer to a direction of an applied magnetic field; and wherein applying said positive or negative voltage V inverts said magnetizing direction of said second ferromagnetic layer, thereby recording magnetization information in said second ferromagnetic layer.

11. The system according to claim 10, wherein application of said positive or negative voltage V induces an exchange magnetic field $H_E$; and wherein said exchange magnetic field $H_E$ and said magnetic field H work together to invert said magnetizing direction of said second ferromagnetic layer.

12. The magnetic recording system according to claim 10, wherein said coercivity $Hc_1$ of said first ferromagnetic layer, said coercivity $Hc_2$ of said second ferromagnetic layer, and said magnetic field H are in a relationship of $Hc_1<H<Hc_2$; and wherein said exchange magnetic field $H_E$ has a relationship of $Hc_2<H+H_E$ with said coercivity $Hc_2$ of said second ferromagnetic layer and said magnetic field H.

13. The magnetic recording system according to claim 12, wherein said exchange magnetic field $H_E$ has a relationship of $H-H_E<Hc_1$ with said coercivity $Hc_1$ of said first ferromagnetic layer and said magnetic field H.

14. An electric field applying magnetic recording method comprising the steps of:
applying a magnetic field H from a magnetic pole to a magnetic recording medium composed of a substrate, a first ferromagnetic layer formed on said substrate, a nonmagnetic layer formed on said first ferromagnetic layer, and a second ferromagnetic layer of which coercivity $Hc_2$ is larger than that $Hc_1$ of said first ferromagnetic layer, formed on said nonmagnetic layer, thereby changing a magnetizing direction of said first ferromagnetic layer to a direction of said applied magnetic field;
applying a positive or negative voltage V between a metallic probe and said magnetic recording medium to change an energy of a quantum well level between said first and second ferromagnetic layers, thereby inducing an exchange magnetic field $H_E$; and
changing a magnetizing direction of said second ferromagnetic layer to a direction of said applied magnetic field with both said exchange magnetic field $H_E$ and said magnetic field H.

15. The method according to claim 14,
wherein said coercivity $Hc_1$ of said first ferromagnetic layer, said coercivity $Hc_2$ of said second ferromagnetic layer, and said magnetic field H are in a relationship of $Hc_1<H<Hc_2$; and
wherein said exchange magnetic field $H_E$ has a relationship of $Hc_2<H+H_E$ with said coercivity $Hc_2$ of said second ferromagnetic layer and said magnetic field H.

16. The method according to claim 14, wherein said exchange magnetic field $H_E$ has a relationship of $H-H_E<Hc_1$ with said coercivity $Hc_1$ of said first ferromagnetic layer and said magnetic field H.

* * * * *